(12) United States Patent
Khosravi et al.

(10) Patent No.: US 11,846,439 B2
(45) Date of Patent: Dec. 19, 2023

(54) BUILDING CONTROL SYSTEM WITH PEER ANALYSIS BASED ON WEIGHTED OUTLIER DETECTION

(71) Applicant: Johnson Controls Tyco IP Holdings LLP, Milwaukee, WI (US)

(72) Inventors: Parisa Khosravi, Odessa, TX (US); Mohammad N. Elbsat, Milwaukee, WI (US); Michael J. Wenzel, Grafton, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 12 days.

(21) Appl. No.: 17/498,553

(22) Filed: Oct. 11, 2021

(65) Prior Publication Data

US 2023/0144177 A1   May 11, 2023

(51) Int. Cl.
| | | |
|---|---|---|
| *F24F 11/49* | (2018.01) | |
| *G05B 15/02* | (2006.01) | |
| *F24F 11/63* | (2018.01) | |
| *F24F 110/10* | (2018.01) | |
| *F24F 140/12* | (2018.01) | |

(52) U.S. Cl.
CPC .............. *F24F 11/49* (2018.01); *F24F 11/63* (2018.01); *G05B 15/02* (2013.01); *F24F 2110/10* (2018.01); *F24F 2140/12* (2018.01)

(58) Field of Classification Search
CPC ........ F24F 11/49; F24F 11/63; F24F 2110/10; F24F 2140/12; F24F 11/30; F24F 11/38; G05B 15/02; G05B 17/02
See application file for complete search history.

(56) References Cited

U.S. PATENT DOCUMENTS

| | | | |
|---|---|---|---|
| 9,135,667 B2 | 9/2015 | Drees et al. | |
| 9,152,610 B2 | 10/2015 | Drees et al. | |
| 9,256,702 B2 | 2/2016 | Elbsat et al. | |
| 9,471,722 B2 | 10/2016 | Drees et al. | |
| 10,402,767 B2 | 9/2019 | Noboa et al. | |
| 2014/0142904 A1* | 5/2014 | Drees | G06Q 10/04 703/2 |

(Continued)

FOREIGN PATENT DOCUMENTS

WO   WO-2018/005760 A1   1/2018

OTHER PUBLICATIONS

Capozzoli, A., Grassi, D. and Causone, F., 2015. Estimation models of heating energy consumption in schools for local authorities planning. Energy and Buildings, 105, pp. 302-313. (Year: 2015).*

(Continued)

*Primary Examiner* — Alicia M. Choi
(74) *Attorney, Agent, or Firm* — Foley & Lardner LLP

(57) ABSTRACT

A system for assessing relative performance among a plurality of heating, ventilation, or air condition (HVAC) assets, the system comprising a processing circuit configured to identify a peer group comprising two or more of the plurality of HVAC assets having a common characteristic, generate values of a peer metric for the HVAC assets in the peer group based on corresponding operation data associated with the HVAC assets, perform a weighted outlier detection process using the values of the peer metric, and initiate an automated action in response to detecting an outlier HVAC asset.

19 Claims, 20 Drawing Sheets

(56) References Cited

U.S. PATENT DOCUMENTS

| | | | | |
|---|---|---|---|---|
| 2014/0142905 | A1* | 5/2014 | Drees | G06F 17/10 |
| | | | | 703/2 |
| 2014/0222394 | A1* | 8/2014 | Drees | G06F 30/20 |
| | | | | 703/2 |
| 2015/0169795 | A1* | 6/2015 | ElBsat | H04L 12/2816 |
| | | | | 703/2 |
| 2016/0004805 | A1* | 1/2016 | Drees | G06F 17/10 |
| | | | | 703/2 |
| 2016/0131383 | A1* | 5/2016 | Zhao | F24F 11/58 |
| | | | | 700/276 |
| 2016/0246268 | A1 | 8/2016 | Elbsat et al. | |
| 2016/0313023 | A1* | 10/2016 | Przybylski | F24F 11/63 |
| 2017/0017214 | A1* | 1/2017 | O'Keeffe | G05B 15/02 |
| 2017/0276571 | A1* | 9/2017 | Vitullo | G06Q 10/06 |
| 2018/0004173 | A1 | 1/2018 | Patel et al. | |
| 2018/0082208 | A1* | 3/2018 | Cormier | G06N 5/048 |
| 2018/0087790 | A1* | 3/2018 | Perez | F24F 11/52 |
| 2018/0113482 | A1* | 4/2018 | Vitullo | G06N 20/20 |
| 2018/0299846 | A1 | 10/2018 | Ray et al. | |
| 2019/0101314 | A1* | 4/2019 | Muthusubramanian | |
| | | | | F25B 49/022 |
| 2019/0195523 | A1* | 6/2019 | Mowris | F24F 11/77 |
| 2019/0287147 | A1 | 9/2019 | Ingale et al. | |
| 2019/0384240 | A1* | 12/2019 | Seki | G05B 19/41875 |
| 2020/0292194 | A1* | 9/2020 | Jayarathne | G05B 13/02 |
| 2020/0344252 | A1* | 10/2020 | Menon | G06F 11/3006 |
| 2020/0393158 | A1 | 12/2020 | Burroughs et al. | |
| 2021/0018204 | A1 | 1/2021 | Burroughs et al. | |
| 2021/0190349 | A1 | 6/2021 | Turney et al. | |
| 2021/0192469 | A1 | 6/2021 | Turney et al. | |
| 2021/0302043 | A1* | 9/2021 | Dempsey | F24F 11/64 |

OTHER PUBLICATIONS

Xu, Y., Yan, C., Shi, J., Lu, Z., Niu, X., Jiang, Y. and Zhu, F., 2021. An anomaly detection and dynamic energy performance evaluation method for HVAC systems based on data mining. Sustainable Energy Technologies and Assessments, 44, p. 101092. (Year: 2021).*

U.S. Appl. No. 17/388,776.

Carey et al., "Resistant and Test-Based Outlier Rejection: Effects on Gaussian One- and Two-Sample Inference," Technometrics, Aug. 1997, vol. 39, No. 3, pp. 320-330.

Caroni et al., "Sequential Application of Wilks's Multivariate Outlier Test," Journal of the Royal Statistical Society, Series C (Applied Statistics), 1992, vol. 41, No. 2, pp. 355-364.

Grubbs, F. E., "Procedures for Detecting Outlying Observations in Samples," Technometrics, Feb. 1969, vol. 11, No. 1. pp. 1-21.

Rosner, B., "Percentage Points for a Generalized ESD Many-Outlier Procedure," Technometrics, May 1983, vol. 25, No. 2, pp. 165-172.

* cited by examiner

BUILDING CONTROL SYSTEM WITH PEER ANALYSIS BASED ON WEIGHTED OUTLIER DETECTION

BACKGROUND

The present disclosure relates generally to control systems for buildings. The present disclosure relates more particularly to determining outlier building control systems based on peer analysis.

Peer analysis is a method for evaluating the performance of a system or piece of equipment relative to others with similar characteristics or operating under similar conditions. Peer analysis of the systems and units can involve amassing peer groups with common characteristics and calculating the values for one or more peer metrics for each member of a peer group based on measured and recorded data from the real system or unit. Using outlier detection methods the values of the peer metrics can be analyzed to identify systems or units that deviate markedly from other members in the same peer group. Because peer analysis involves comparing performance across discrete systems or units, sufficient data from each is necessary to generate an accurate analysis. However, if not enough data for a given system is available or the data is uncertain, the resulting analysis can be skewed and generate inaccurate results.

SUMMARY

One implementation of the present disclosure is a system for assessing relative performance among a plurality of heating, ventilation, or air condition (HVAC) assets, the system comprising a processing circuit configured to identify a peer group comprising two or more of the plurality of HVAC assets having a common characteristic, generate values of a peer metric for the HVAC assets in the peer group based on corresponding operation data associated with the HVAC assets, perform a weighted outlier detection process using the values of the peer metric, and initiate an automated action in response to detecting an outlier HVAC asset. t.

In some embodiments, the peer metric includes at least one peer metric selected from a plurality of peer metrics based on the peer group.

In some embodiments, the weighted outlier detection process includes assigning weights to the values of the peer metric, the weights a function of an amount of operation data used to generate the values of the peer metric.

In some embodiments, the operation data include a measured temperate and a setpoint temperature for the plurality of HVAC assets, and the peer metric is a temperature control error based on the measured temperature and the setpoint temperature for each of the plurality of HVAC assets of the peer group.

In some embodiments, the operation data include an actuation signal for a flow control device for the plurality of HVAC assets and the peer metric is a control effort based on the actuation signal for each of the plurality of HVAC assets of the peer group.

In some embodiments, the operation data include a compressor suction pressure and a compressor discharge pressure for the plurality of HVAC assets, and the peer metric is a compression ratio based on the compressor suction pressure and a compressor discharge pressure for each of the plurality of HVAC assets of the peer group.

In some embodiments, the processing circuit is further configured to generate values of a plurality of peer metric for the HVAC assets in the peer group based on corresponding operation data associated with the HVAC assets, wherein the operation data include a number of off times less than or equal to a first time threshold, a number of cycles, and a number of cycle times less than or equal to a second time threshold for the plurality of HVAC assets, and the plurality of peer metrics includes an off time metric and a cycle time metric based on the number of off times less than or equal to a first time period, number of cycles, and number of cycle times less than or equal to a second time period for each of the plurality of HVAC assets of the peer group.

In some embodiments, the plurality of HVAC assets includes a plurality of sensors configured to obtain the operation data associated with the plurality of HVAC assets.

In some embodiments, the weighted outlier detection process is a univariate process comparing the peer metric across the plurality of HVAC assets for the peer group and the univariate process includes a weighted Generalized Extreme Studentized Deviate test.

In some embodiments, the outlier detection process is a multivariate process comparing a plurality of peer metrics for the plurality of HVAC assets in the peer group and the multivariate process includes a modified Sequential Application of Wilks's Multivariate Outlier Test.

In some embodiments the outlier detection process includes calculating a mean vector for a set comprising the values of the plurality of peer metrics, determining a matrix of the sums of squares and cross-products ("SSCP matrix") for deviation scores of the set of values using the mean vector, weighting the SSCP matrix, wherein the weighting is a function of an amount of operation data used to generate the values of the plurality of peer metrics, determining a potential outlier HVAC asset from the plurality of HVAC assets as the HVAC asset corresponding to the peer metric value whose removal leads to the greatest reduction in the determinant of the weighted SSCP matrix, calculating a weighted Wilk's Statistic using the peer metrics associated with the potential outlier HVAC asset and the weighted SSCP matrix, and comparing the weighted Wilk's Statistic to a critical value to determine the outlier HVAC asset.

Another implementation of the present disclosure is a method for assessing relative performance among a plurality heating, ventilation, or air conditioning (HVAC) assets, the method including identifying a peer group comprising two or more of the plurality of HVAC assets having a common characteristic, generating values of a peer metric for the HVAC assets in the peer group based on corresponding operation data associated with the HVAC assets, performing a weighted outlier detection process using the values of the peer metric, and initiating an automated action in response to detecting an outlier HVAC asset.

In some embodiments, the automated action includes displaying the results of the outlier detection process to a user.

In some embodiments, the method further includes identifying a first time period for wherein the operation data associated with the plurality of HVAC assets belongs to the first time period.

In some embodiments, the operation data include a measured temperature and a setpoint temperature for the plurality of HVAC assets and the peer metric is a temperature control error based on the measured temperature and the setpoint temperature for each of the plurality of HVAC assets of the peer group.

In some embodiments, the operation data include an actuation signal for a flow control device for the plurality of HVAC assets, and the peer metric is a control effort based on the actuation signal for each of the plurality of HVAC assets of the peer group.

In some embodiments, the operation data include a compressor suction pressure and a compressor discharge pressure for the plurality of HVAC assets, and the peer metric is a compression ratio, based on the compressor suction pressure and the compressor discharge pressure for each of the plurality of HVAC assets of the peer group.

In some embodiments, the method further includes generating values of a plurality of peer metrics for the HVAC assets in the peer group based on corresponding operation data associated with the HVAC assets; wherein the operation data include a number of off times less than or equal to a first time period, a number of cycles, and a number of cycle times less than or equal to a second time period for the plurality of HVAC asset, and the plurality of peer metrics include an off time metric and a cycle time metric based on the number of off times less than or equal to a first time threshold, number of cycles, and number of cycle times less than or equal to a second time threshold for each of the plurality of HVAC assets of the peer group.

In some embodiments, the operation data include an energy consumption and heating or cooling output for the plurality of HVAC assets, and the peer metric is an efficiency based on the energy consumption and the heating or cooling output for each of the plurality of HVAC assets of the peer group.

In some embodiments, the weighted outlier detection process is at least one of a univariate process comparing the peer metric across the plurality of HVAC assets of the peer group and a multivariate process comparing a plurality of peer metrics for the plurality of HVAC assets in the peer group of a plurality of types.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 17 is an illustration of a user interface for a peer analysis test run using univariate outlier detection, according to some embodiments.

FIG. 18 is an illustration of a user interface including a peer analysis time period element for a selecting the time period for a peer analysis, according to some embodiments.

FIG. 19 is an illustration of a user interface for a peer analysis test run using multivariate outlier detection, according to some embodiments.

DETAILED DESCRIPTION

Figure 1:
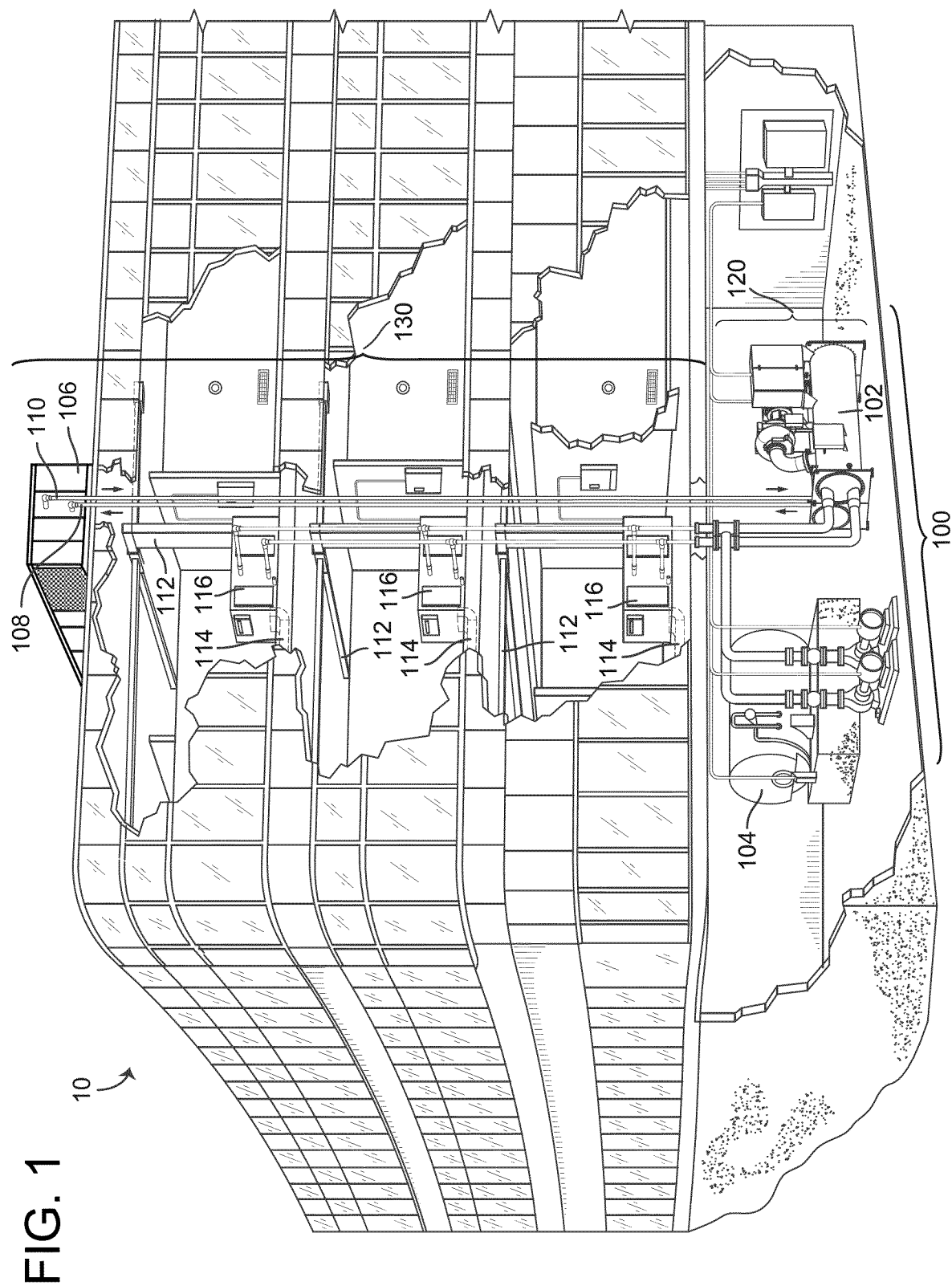
FIG. 1 is a drawing of a building equipped with a HVAC asset, according to some embodiments.

Referring generally to the FIGURES, systems and methods for performing peer analysis based on weighted outlier detection are shown, according to some embodiments. Peer analysis involves comparing peer metrics of HVAC assets or units amongst peer group members. Peer groups are groupings of HVAC assets or units that share similar characteristics or operate under similar conditions. Peer metrics can be measured or derived, and which peer metrics are calculated and compared may depend on the characteristics of the chosen peer group. The values of the peer metrics can be weighted according to the amount of data used to calculate the peer metric to account for small or uncertain data sets.

The overarching presumption behind peer analysis is that HVAC assets that are similar should have similar peer metrics. Peer metrics that deviate from the norm among members of a given peer group can be flagged and the corresponding HVAC assets or units marked as outliers. Outlier analysis on the values of the peer metrics is performed to discover these outliers, and it can include multivariate outlier analysis, univariate outlier analysis, DBCAN, isolation forest, Z-Score, etc. Univariate outlier detection analyzes the distribution of values for a single peer metric in the group. Multivariate outlier detection can detect outliers in an n-dimensional space of n-peer metrics. In some embodiments multivariate detection methods may detect outliers that are not detectable by univariate methods. The values of the peer metrics can be weighted based on the amount of available data used to calculate the metric relative to the total amount of data in the peer group to compensate for data collection methodologies that provide uncertain data. Advantageously, weighting the value of the peer metrics can reduce the effect of observations with uncertain data on outlier detection (i.e., reduce the number of false positives and false negatives).

Outlier systems or units may be faulty, operating under a non-ideal control scheme, a result of instrument error, etc. In some embodiments outlier systems or units may be over-performers, and instead indicate under-performance in the rest of the members of the peer group. Outlier detection allows for identifying faults before they become critical and for improving the overall performance of a peer group.

If a specific HVAC asset or unit is determined to be an outlier, an automated action can be initiated, and the automated action can be directed to address the outlier. The automated action can be a part of various applications such as control-based applications to improve the performance of the outlier, the peer group, or both. For example, automated actions can include performing a new peer analysis, alerting a user to the outlier, repairing existing building equipment, changing a data value or set point in a system or unit, modifying a control scheme, etc. Based on the initiation of an automated action, the automated action can be performed in order to address the outlier, and/or the non-outlier systems. These and other features of peer analysis based on weighted outlier detection are discussed in greater details below.

Building HVAC Assets

Figure 2:
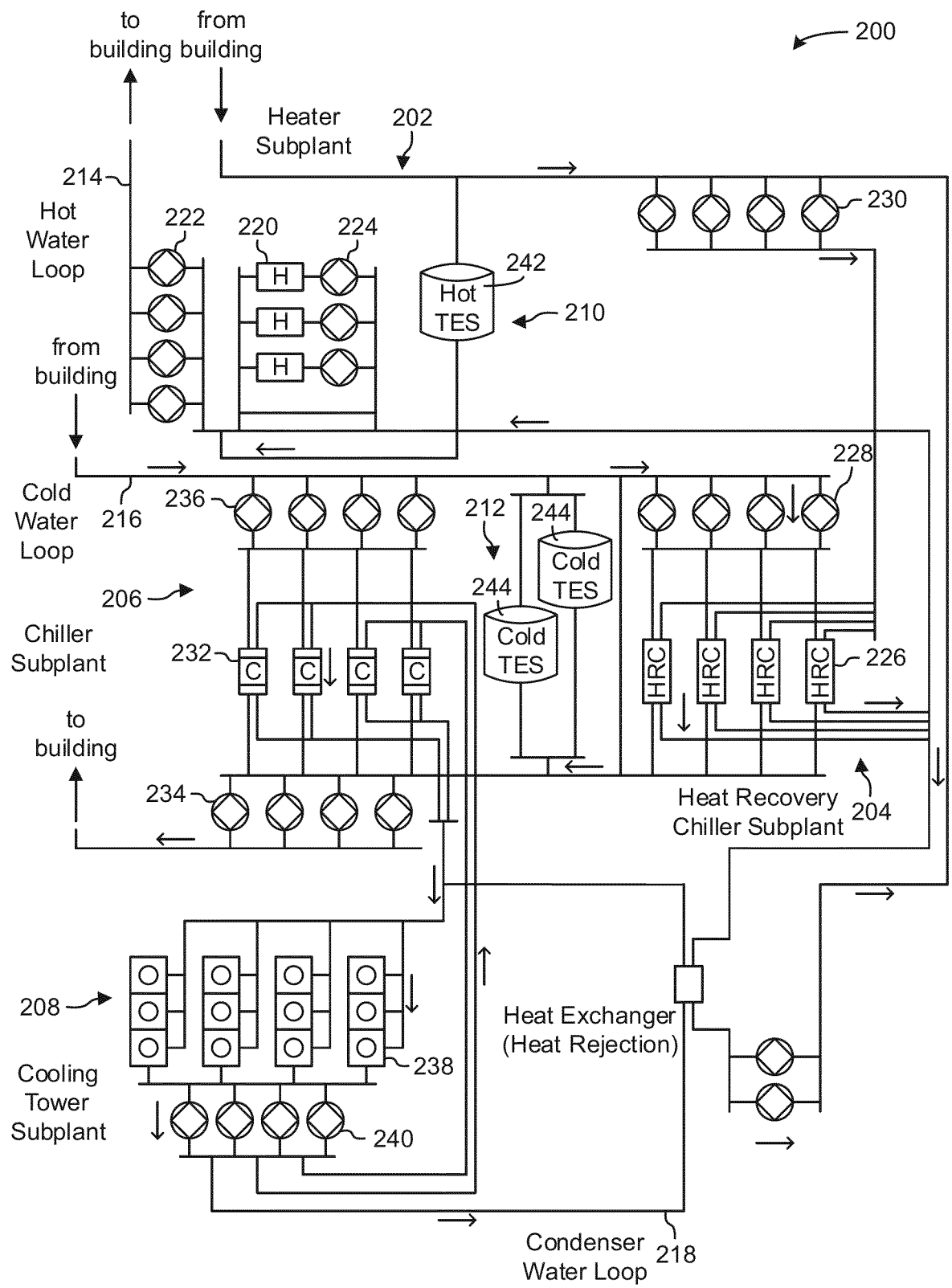
FIG. 2 is a block diagram of a waterside system which can be used to serve the heating or cooling loads of the building of FIG. 1, according to some embodiments.
Figure 3:
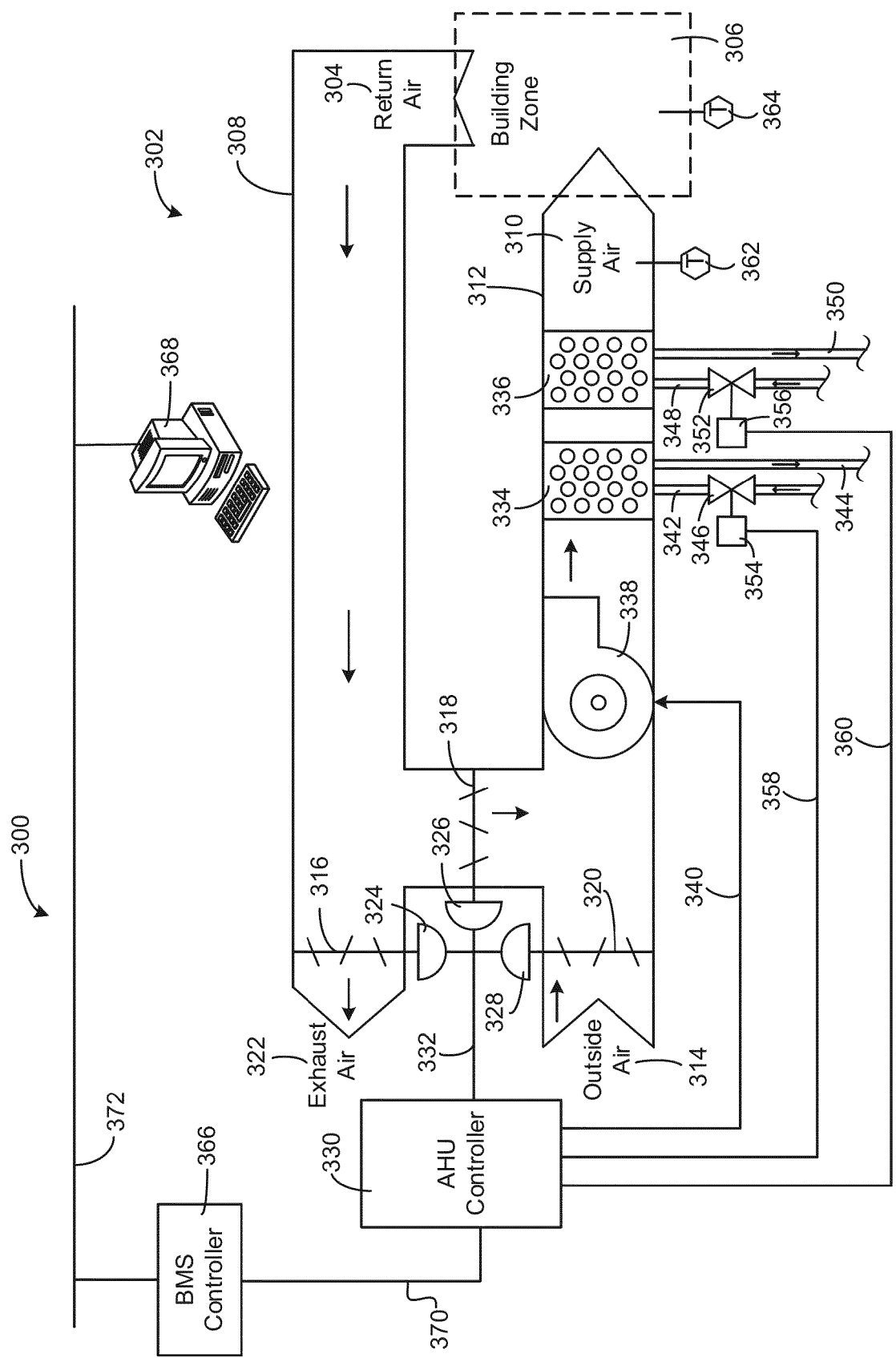
FIG. 3 is a block diagram of an airside system which can be used to serve the heating or cooling loads of the building of FIG. 1, according to some embodiments.
Figure 4:
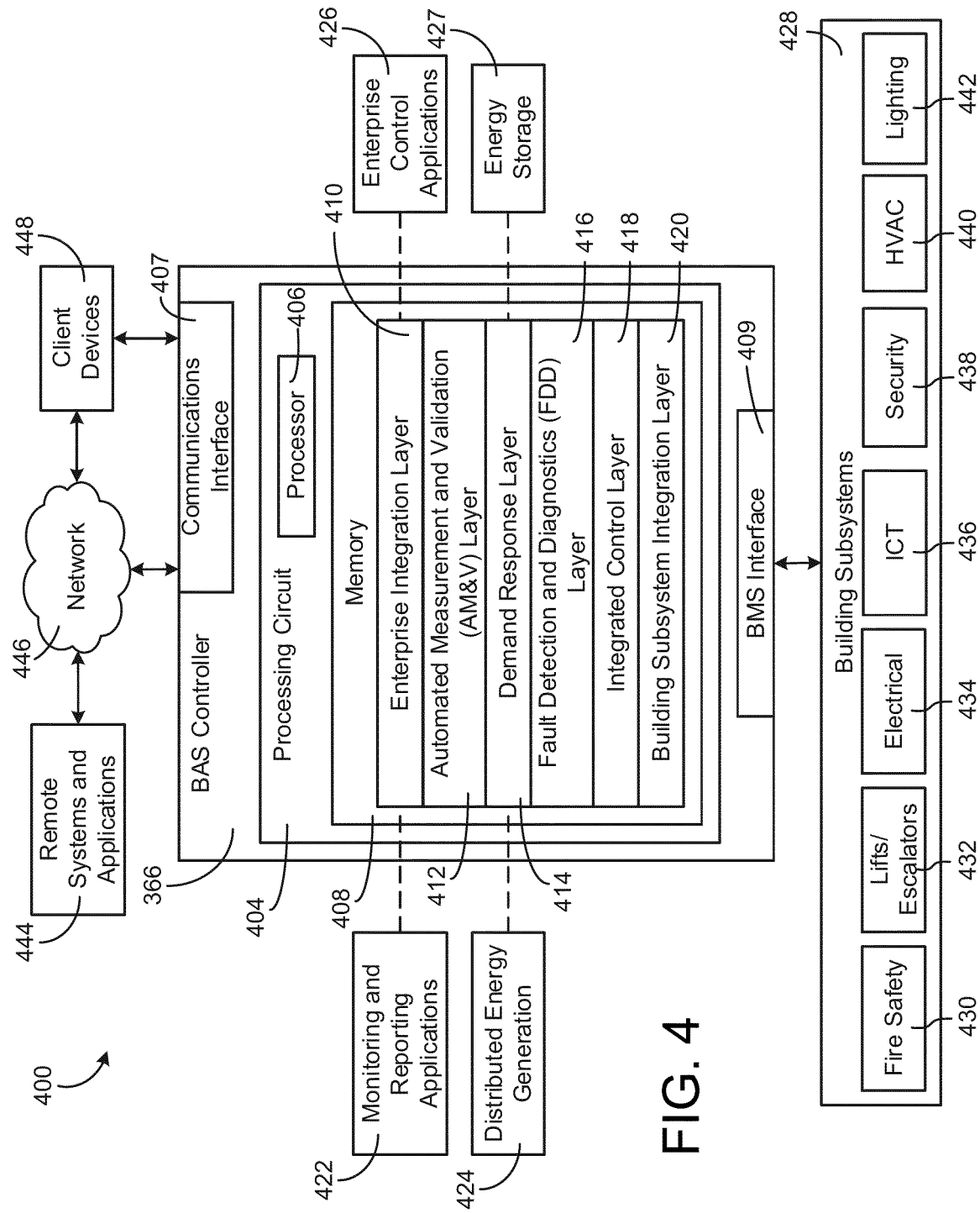
FIG. 4 is a block diagram of a building management system (BMS) which can be used to monitor and control the building of FIG. 1, according to some embodiments.
Figure 5:
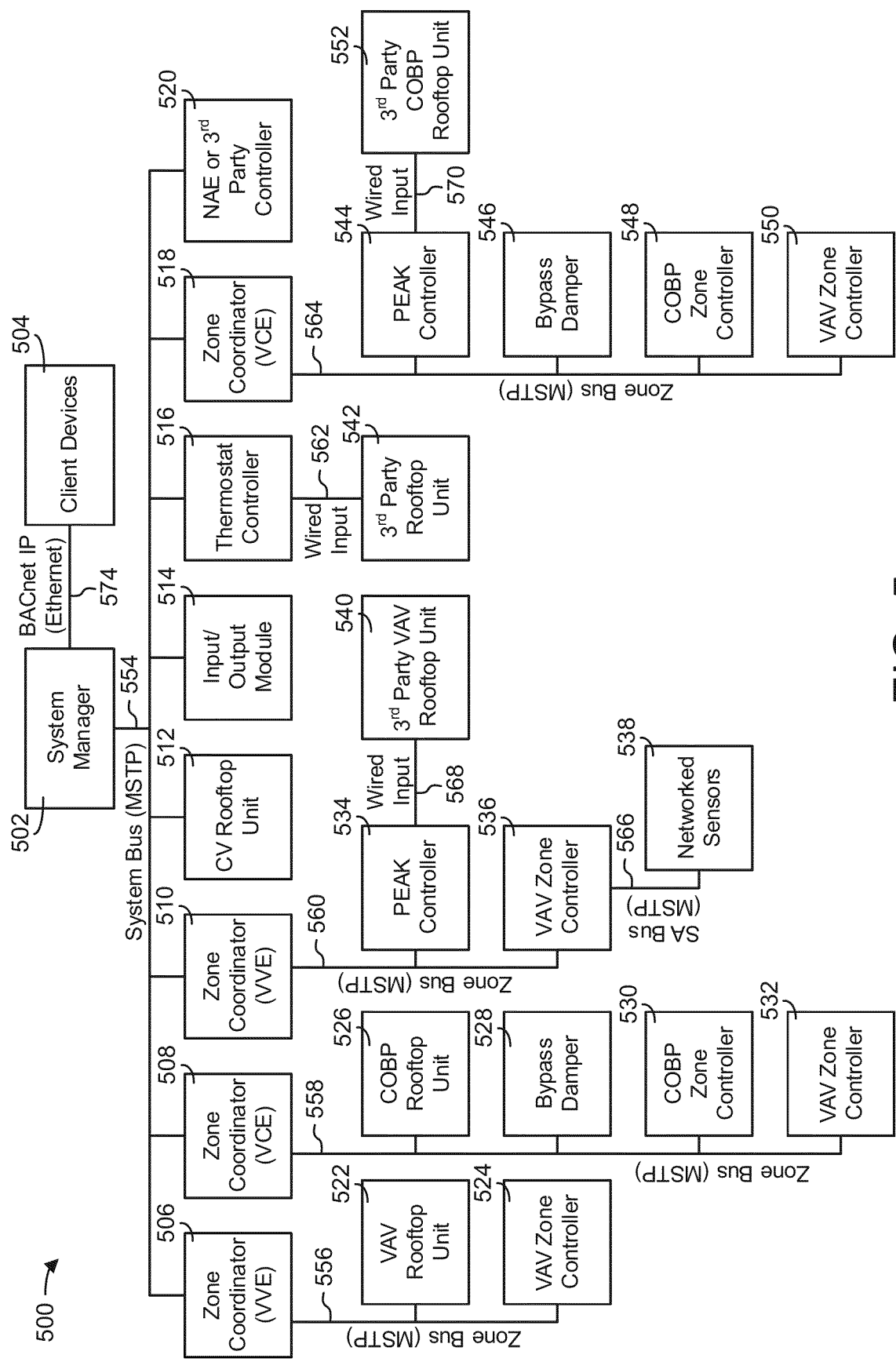
FIG. 5 is a block diagram of another BMS which can be used to monitor and control the building of FIG. 1, according to some embodiments.

Referring now to FIGS. 1-5, several building management systems (BMS) and HVAC assets in which the systems and methods of the present disclosure can be implemented are shown, according to some embodiments. In brief overview, FIG. 1 shows a building 10 equipped with a HVAC asset 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC asset, a security system, a lighting system, a fire alerting system, any other system that is capable of managing building functions or devices, or any combination thereof.

The BMS that serves building 10 includes a HVAC asset 100. HVAC asset 100 can include a plurality of HVAC devices (e.g., heaters, chillers, air handling units, pumps, fans, thermal energy storage, etc.) configured to provide heating, cooling, ventilation, or other services for building 10. For example, HVAC asset 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC asset 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC asset 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

Waterside System

Referring now to FIG. 2, a block diagram of a waterside system 200 is shown, according to some embodiments. In various embodiments, waterside system 200 may supplement or replace waterside system 120 in HVAC asset 100 or can be implemented separate from HVAC asset 100. When implemented in HVAC asset 100, waterside system 200 can include a subset of the HVAC devices in HVAC asset 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC asset 100 or can be implemented separate from HVAC asset 100. When implemented in HVAC asset 100, airside system 300 can include a subset of the HVAC devices in HVAC asset 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC asset 100, and/or other controllable systems that serve building 10. BMS controller 366 may communicate with multiple downstream building systems or subsystems (e.g., HVAC asset 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC asset 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 370.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described in FIGS. 2-3.

Each of building subsystems 428 can include any number of devices, controllers, and connections for completing its individual functions and control activities. HVAC subsystem 440 can include many of the same components as HVAC asset 100, as described in FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or building subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 may translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the building subsystems 428 such that the building subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC asset 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Variable Refrigerant Flow Systems

Figure 6A:
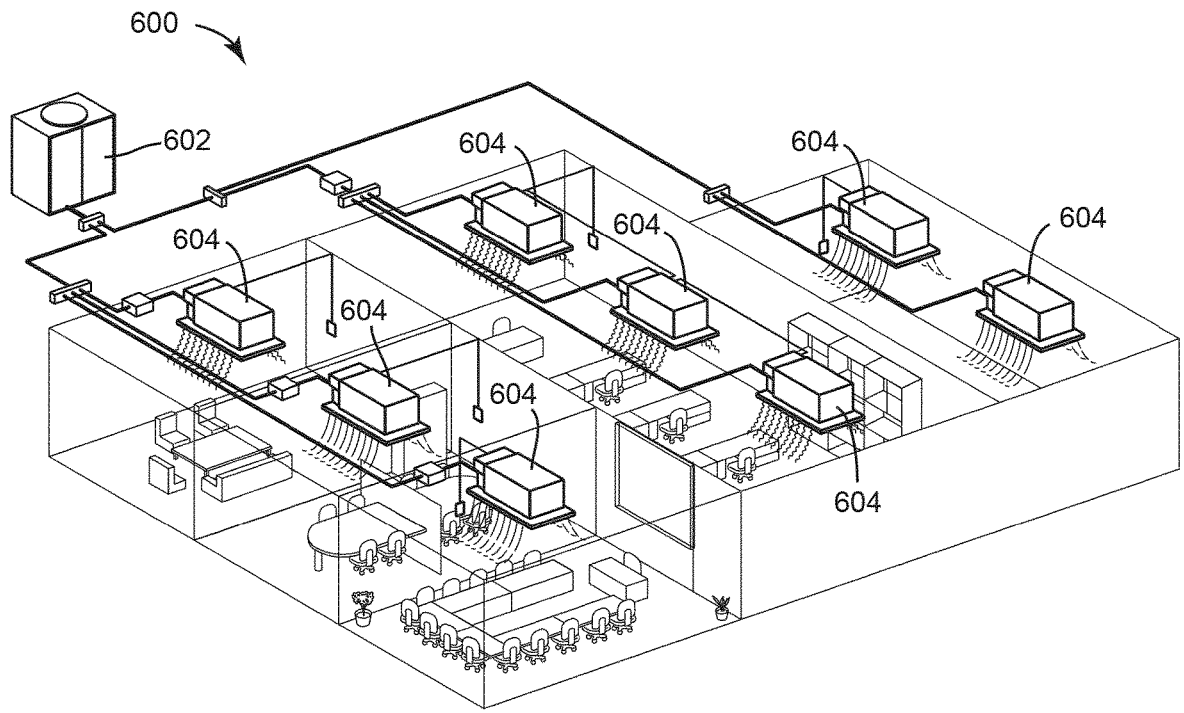
FIGS. 6A-6B are drawings of a variable refrigerant flow (VRF) system having one or more outdoor VRF units and multiple indoor VRF units, according to some embodiments.
Figure 6B:
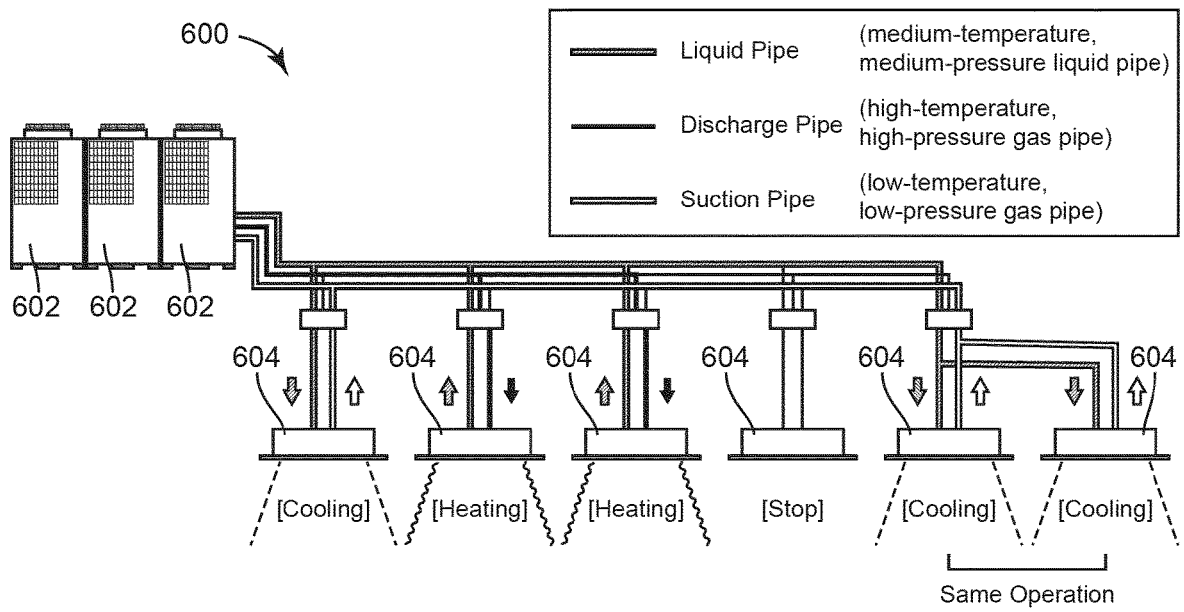

Referring now to FIGS. 6A-6B, a variable refrigerant flow (VRF) system 600 is shown, according to some embodiments. VRF system 600 is shown to include one or more outdoor VRF units 602 and a plurality of indoor VRF units 604. Outdoor VRF units 602 can be located outside a building and can operate to heat or cool a refrigerant. Outdoor VRF units 602 can consume electricity to convert refrigerant between liquid, gas, and/or super-heated gas phases. Indoor VRF units 604 can be distributed throughout various building zones within a building and can receive the heated or cooled refrigerant from outdoor VRF units 602. Each indoor VRF unit 604 can provide temperature control for the particular building zone in which the indoor VRF unit 604 is located. Although the term "indoor" is used to denote that the indoor VRF units 604 are typically located inside of buildings, in some cases one or more indoor VRF units are located "outdoors" (i.e., outside of a building) for example to heat/cool a patio, entryway, walkway, etc.

One advantage of VRF system 600 is that some indoor VRF units 604 can operate in a cooling mode while other indoor VRF units 604 operate in a heating mode. For example, each of outdoor VRF units 602 and indoor VRF units 604 can operate in a heating mode, a cooling mode, or an off mode. Each building zone can be controlled independently and can have different temperature setpoints. In some embodiments, each building has up to three outdoor VRF units 602 located outside the building (e.g., on a rooftop) and up to 128 indoor VRF units 604 distributed throughout the building (e.g., in various building zones). Building zones may include, among other possibilities, apartment units, offices, retail spaces, and common areas. In some cases, various building zones are owned, leased, or otherwise occupied by a variety of tenants, all served by the VRF system 600.

Many different configurations exist for VRF system 600. In some embodiments, VRF system 600 is a two-pipe system in which each outdoor VRF unit 602 connects to a single refrigerant return line and a single refrigerant outlet line. In a two-pipe system, all of outdoor VRF units 602 may operate in the same mode since only one of a heated or chilled refrigerant can be provided via the single refrigerant outlet line. In other embodiments, VRF system 600 is a three-pipe system in which each outdoor VRF unit 602 connects to a refrigerant return line, a hot refrigerant outlet line, and a cold refrigerant outlet line. In a three-pipe system, both heating and cooling can be provided simultaneously via the dual refrigerant outlet lines.

Figure 7:
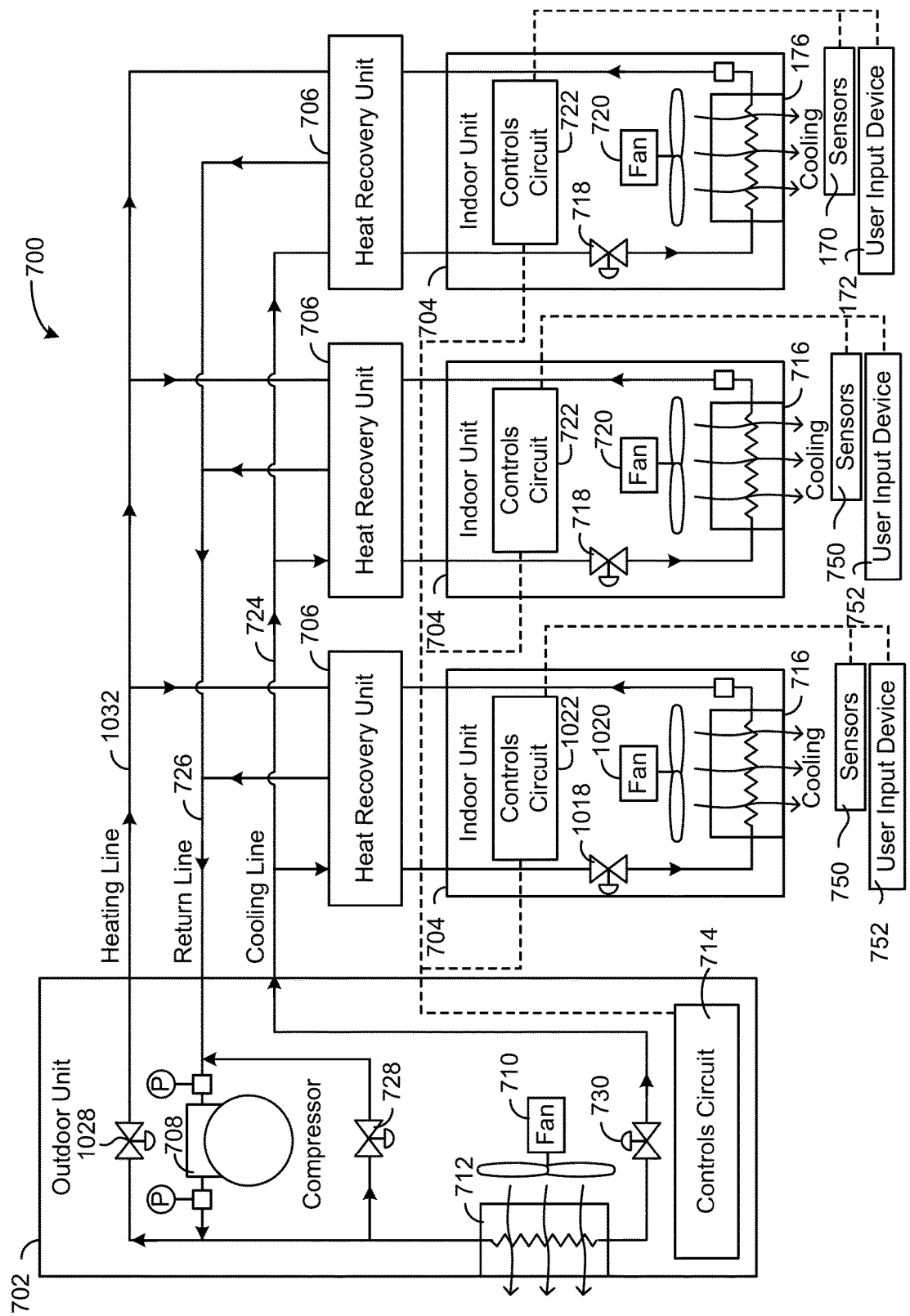
FIG. 7 is a schematic diagram of a VRF system, according to some embodiments.

Referring now to FIG. 7, a block diagram illustrating a VRF system 700 is shown, according to an exemplary embodiment. VRF system 700 is shown to include outdoor VRF unit 702, several heat recovery units 706, and several indoor VRF units 704. Although FIG. 7 shows one outdoor VRF unit 702, embodiments including multiple outdoor VRF units 702 are also within the scope of the present disclosure. Outdoor VRF unit 702 may include a compressor 708, a fan 710, or other power-consuming refrigeration components configured convert a refrigerant between liquid, gas, and/or super-heated gas phases. Indoor VRF units 704 can be distributed throughout various building zones within a building and can receive the heated or cooled refrigerant from outdoor VRF unit 702. Each indoor VRF unit 704 can provide temperature control for the particular building zone in which the indoor VRF unit 704 is located. Heat recovery units 706 can control the flow of a refrigerant between outdoor VRF unit 702 and indoor VRF units 704 (e.g., by opening or closing valves) and can minimize the heating or cooling load to be served by outdoor VRF unit 702.

Outdoor VRF unit 702 is shown to include a compressor 708 and a heat exchanger 712. Compressor 708 circulates a refrigerant between heat exchanger 712 and indoor VRF units 704. The compressor 708 operates at a variable frequency as controlled by VRF Controller 714. At higher frequencies, the compressor 708 provides the indoor VRF units 704 with greater heat transfer capacity. Electrical power consumption of compressor 708 increases proportionally with compressor frequency.

Heat exchanger 712 can function as a condenser (allowing the refrigerant to reject heat to the outside air) when VRF system 700 operates in a cooling mode or as an evaporator (allowing the refrigerant to absorb heat from the outside air) when VRF system 700 operates in a heating mode. Fan 710 provides airflow through heat exchanger 712. The speed of fan 710 can be adjusted (e.g., by VRF Controller 714) to modulate the rate of heat transfer into or out of the refrigerant in heat exchanger 712.

Each indoor VRF unit 704 is shown to include a heat exchanger 716 and an expansion valve 718. Each of heat exchangers 716 can function as a condenser (allowing the refrigerant to reject heat to the air within the room or zone) when the indoor VRF unit 704 operates in a heating mode or as an evaporator (allowing the refrigerant to absorb heat from the air within the room or zone) when the indoor VRF unit 704 operates in a cooling mode. Fans 720 provide airflow through heat exchangers 716. The speeds of fans 720 can be adjusted (e.g., by indoor unit controls circuits 722) to modulate the rate of heat transfer into or out of the refrigerant in heat exchangers 716.

In FIG. 7, indoor VRF units 704 are shown operating in the cooling mode. In the cooling mode, the refrigerant is provided to indoor VRF units 704 via cooling line 724. The refrigerant is expanded by expansion valves 718 to a cold, low pressure state and flows through heat exchangers 716 (functioning as evaporators) to absorb heat from the room or zone within the building. The heated refrigerant then flows back to outdoor VRF unit 702 via return line 726 and is compressed by compressor 708 to a hot, high pressure state. The compressed refrigerant flows through heat exchanger 712 (functioning as a condenser) and rejects heat to the outside air. The cooled refrigerant can then be provided back to indoor VRF units 704 via cooling line 724. In the cooling mode, flow control valves 728 can be closed and expansion valve 730 can be completely open.

In the heating mode, the refrigerant is provided to indoor VRF units 704 in a hot state via heating line 732. The hot refrigerant flows through heat exchangers 716 (functioning as condensers) and rejects heat to the air within the room or zone of the building. The refrigerant then flows back to outdoor VRF unit via cooling line 724 (opposite the flow direction shown in FIG. 7). The refrigerant can be expanded by expansion valve 730 to a colder, lower pressure state. The expanded refrigerant flows through heat exchanger 712 (functioning as an evaporator) and absorbs heat from the outside air. The heated refrigerant can be compressed by compressor 708 and provided back to indoor VRF units 704 via heating line 732 in a hot, compressed state. In the heating mode, flow control valves 728 can be completely open to allow the refrigerant from compressor 708 to flow into heating line 732.

As shown in FIG. 7, each indoor VRF unit 704 includes an indoor unit controls circuit 722. Indoor unit controls circuit 722 controls the operation of components of the indoor VRF unit 704, including the fan 720 and the expansion valve 718, in response to a building zone temperature setpoint or other request to provide heating/cooling to the building zone. The indoor unit controls circuit 722 may also determine a heat transfer capacity required by the indoor VRF unit 704 and transmit a request to the outdoor VRF unit 702 requesting that the outdoor VRF unit 702 operate at a corresponding capacity to provide heated/cooled refrigerant to the indoor VRF unit 704 to allow the indoor VRF unit 704 to provide a desired level of heating/cooling to the building zone.

Each indoor unit controls circuit 722 is shown as communicably coupled to one or more sensors 750 and a user input device 752. In some embodiments, the one or more sensors 750 may include a temperature sensor (e.g., measuring indoor air temperature), a humidity sensor, and/or a sensor measuring some other environmental condition of a building zone served by the indoor VRF unit 704. In some embodiments, the one or more sensors include an occupancy detector configured to detect the presence of one or more people in the building zone and provide an indication of the occupancy of the building zone to the indoor unit controls circuit 722.

Each user input device 752 may be located in the building zone served by a corresponding indoor unit 704. The user input device 752 allows a user to input a request to the VRF system 700 for heating or cooling for the building zone and/or a request for the VRF system 700 to stop heating/cooling the building zone. According to various embodiments, the user input device 752 may include a switch, button, set of buttons, thermostat, touchscreen display, etc. The user input device 752 thereby allows a user to control the VRF system 700 to receive heating/cooling when desired by the user.

The indoor unit controls circuit 722 may thereby receive an indication of the occupancy of a building zone (e.g., from an occupancy detector of sensors 750 and/or an input of a user via user input device 752). In response, the indoor unit controls circuit 722 may generate a new request for the outdoor VRF unit 702 to operate at a requested operating capacity to provide refrigerant to the indoor unit 704. The indoor unit controls circuit 722 may also receive an indication that the building zone is unoccupied and, in response, generate a signal instructing the outdoor VRF unit 702 to stop operating at the requested capacity. The indoor unit controls circuit 722 may also control various components of the indoor unit 704, for example by generating a signal to turn the fan 720 on and off.

The outdoor unit controls circuit 714 may receive heating/cooling capacity requests from one or more indoor unit controls circuits 722 and aggregate the requests to determine a total requested operating capacity. Accordingly, the total requested operating capacity may be influenced by the occupancy of each of the various building zones served by various indoor units 704. In many cases, a when a person or people first enter a building zone and a heating/cooling request for that zone is triggered, the total requested operating capacity may increase significantly, for example reaching a maximum operating capacity. Thus, the total request operating capacity may vary irregularly and unpredictably as a result of the sporadic occupation of various building zones.

The outdoor unit controls circuit 714 is configured to control the compressor 708 and various other elements of the outdoor unit 702 to operate at an operating capacity based at least in part on the total requested operating capacity. At higher operating capacities, the outdoor unit 702 consumes more power, which increases utility costs. In some embodiments, the VRF controller may be capable of For an operator, owner, lessee, etc. of a VRF system, it may be desirable to minimize power consumption and utility costs to save money, improve environmental sustainability, reduce wear-and-tear on equipment, etc. In some cases, multiple entities or people benefit from reduced utility costs, for example according to various cost apportionment schemes for VRF systems described in U.S. patent application Ser. No. 15/920,077 filed Mar. 13, 2018, incorporated by reference herein in its entirety. Thus, as described in detail below, the controls circuit 714 may be configured to manage the operating capacity of the outdoor VRF unit 702 to reduce utility costs while also providing comfort to building occupants. Accordingly, in some embodiments, the controls circuit 714 may be operable in concert with systems and methods described in P.C.T. Patent Application No. PCT/US2017/039937 filed Jun. 29, 2017, and/or U.S. patent application Ser. No. 15/635,754 filed Jun. 28, 2017, both of which are incorporated by reference herein in their entireties.

Peer Analysis System

Referring generally to FIGS. 8-19, systems and methods for performing peer analysis to detect outlier systems or pieces of equipment are shown, according to some embodiments. Peer analysis is a process used to evaluate the performance of systems or pieces of equipment relative to their peers, using one or more peer metrics. Peer analysis begins with creating peer groups of systems or pieces of equipment based on one or more shared characteristics. One or more peer metrics can be generated based on system data for each of the systems and/or pieces of equipment in the peer group allowing for the systems to be compared. With outlier analysis, the peer metric(s) are analyzed using outlier detection methods to identify systems operating differently from other systems within the same peer group. Outlier detection is useful for determining both systems that are underperforming as compared to their peer group as well as systems that may be overperforming. Outliers may exist due to mechanical faults, changes in system behavior, human error, instrument error, or simply the result of natural deviations in a population. Detecting outliers early can identify faults before they become critical, or comparatively, allow for adjusting underperforming systems to match overperforming outliers without having to unnecessarily bear the lost efficiency of the underperforming systems. Outlier detection requires a sufficient amount of data to prove accurate. To account for circumstances where not enough data is available, or the available data is uncertain, the peer metric values can be weighted prior to the outlier detection process. The weights are based on the amount of data used to calculate the peer metric(s). Advantageously, weighting the peer metric values allows the outlier detection process to accurately identify outliers in small data sets. The systems and methods of FIGS. 8-19 can be implemented using or as a part of a building management system or HVAC asset, for example HVAC asset 100 or VRF system 600, according to some embodiments.

Figure 8:
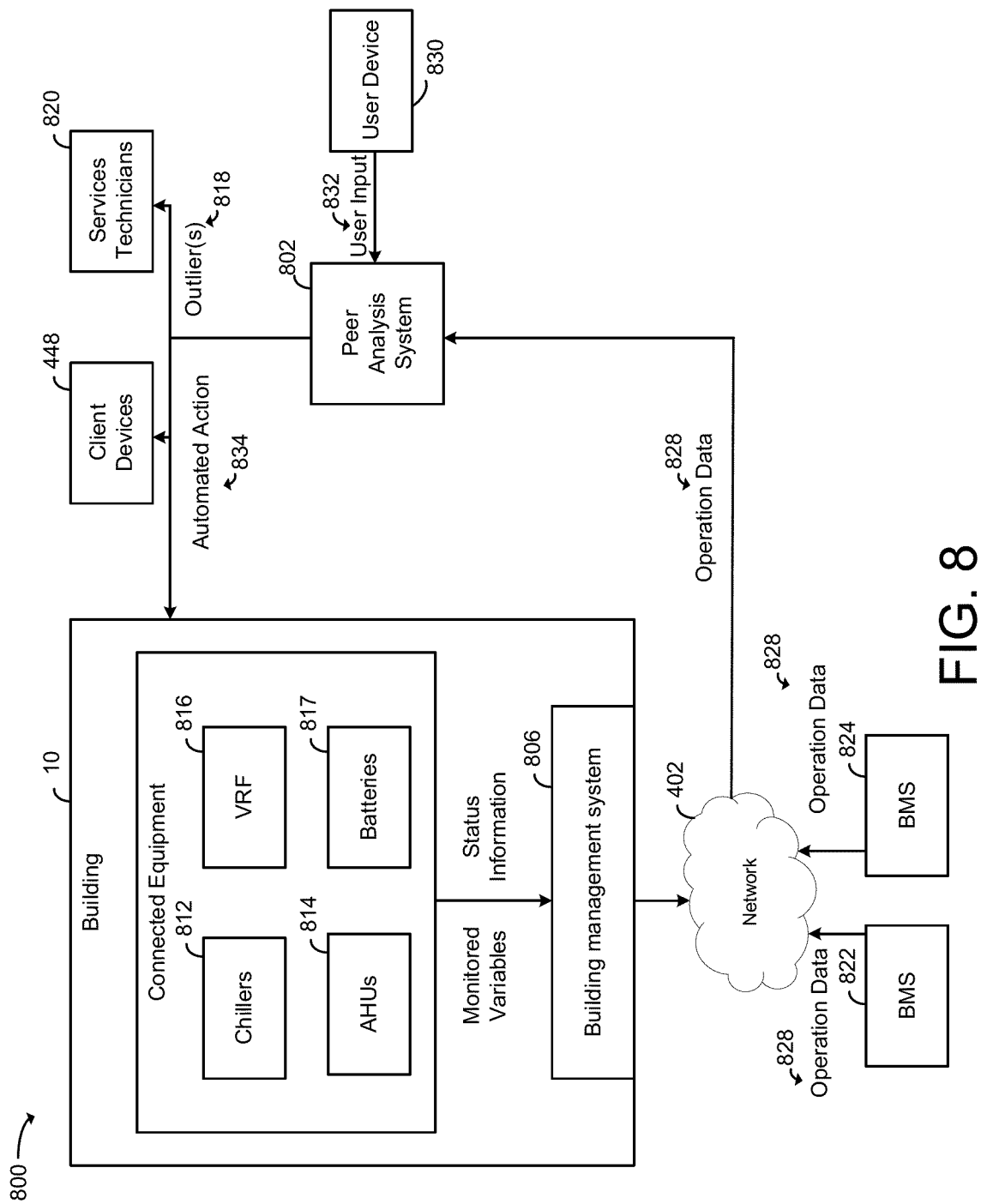
FIG. 8 is a block diagram of a building system 800 connected to a peer analysis system 802, according to an exemplary embodiment.

Referring now to FIG. 8, a block diagram of a building system 800 is shown, according to an exemplary embodiment. System 800 may include many of the same components as BMS 400 and BMS 500 as described with reference to FIGS. 4-5. For example, system 800 is shown to include building 10, network 446, and client devices 448. Building 10 is shown to include connected equipment 810, which can include any type of equipment used to monitor and/or control building 10. Connected equipment 810 can include chillers 812, AHUs 814, VRF 816, batteries 817, or any other type of equipment in a building system (e.g., heaters, economizers, valves, actuators, dampers, cooling towers, fans, pumps, etc.) or building management system (e.g., lighting equipment, security equipment, refrigeration equipment, etc.). Connected equipment 810 can include any of the equipment of HVAC asset 100, waterside system 200, airside system 300, BMS 400, BMS 500, VRF 600, and/or VRF 700 as described with reference to FIGS. 1-7.

Connected equipment 810 can be outfitted with sensors to monitor various conditions of the connected equipment 810 (e.g., power consumption, on/off states, operating efficiency, temperature etc.). For example, chillers 812 can include sensors configured to monitor chiller variables such as chilled water temperature, condensing water temperature, and refrigerant properties (e.g., refrigerant pressure, refrigerant temperature, etc.) at various locations in the refrigeration circuit, and VRF sensors can be configured to monitor measured temperature, setpoint temperature, compressor on time, compressor off time, etc. In some embodiments, chiller 700 includes sensors that measure a set of monitored variables at various locations along the refrigeration circuit. Similarly, AHUs 814 can be outfitted with sensors to monitor AHU variables such as supply air temperature and humidity, outside air temperature and humidity, return air temperature and humidity, chilled fluid temperature, heated fluid temperature, damper position, etc. In general, connected equipment 810 can monitor and report variables that characterize the performance of the connected equipment 810. Each monitored variable can be forwarded to BMS 806 as a data point including a point ID and a point value.

Monitored variables can include any measured or calculated values indicating the performance of and/or identifying connected equipment 810 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables can be received from connected equipment 810 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices.

Connected equipment 810 can also report equipment status information. Equipment status information can include, for example, the operational status of the equipment, an operating mode (e.g., low load, medium load, high load, etc.), an indication of whether the equipment is running under normal or abnormal conditions, the hours during which the equipment is running, a safety fault code, a manufacturer, or any other information that indicates the current status of connected equipment 810. In some embodiments, each device of connected equipment 810 includes a control panel. Control panel 710 can be configured to collect monitored variables and equipment status information from connected equipment 810 and provide the collected data to BMS 806.

Connected equipment 810 can provide monitored variables and equipment status information to BMS 806. BMS 806 can include a building controller (e.g., BMS controller 366), a system manager (e.g., system manager 502), a network automation engine, or any other system or device of building 10 configured to communicate with connected equipment 810. BMS 806 may include some or all of the components of BMS 400 or BMS 500, as described with reference to FIGS. 4-5. In some embodiments, the monitored variables and the equipment status information are provided to BMS 806 as data points. Each data point can include a point ID and a point value. The point ID can identify the type of data point or a variable measured by the data point (e.g., condenser pressure, refrigerant temperature, power consumption, etc.). Monitored variables can be identified by name or by an alphanumeric code (e.g., Chilled Water Temp, 7694, etc.). The point value can include an alphanumeric value indicating the current value of the data point.

BMS 806 can broadcast the monitored variables and the equipment status information (i.e., operati data) as operation data 828 to a peer analysis system 802 via network 446. In some embodiments, peer analysis system 802 is a component of BMS 806. For example, peer analysis system 802 can be implemented as part of a METASYS® brand building automation system, as sold by Johnson Controls Inc. In other embodiments, peer analysis system 802 can be a component of a remote computing system or cloud-based computing system configured to receive and process data from one or more building management systems via network 446. In other embodiments, peer analysis system 802 can be a component of a subsystem level controller (e.g., a HVAC controller, a VRF controller), a subplant controller, a device controller (e.g., AHU controller 330, a chiller controller, etc.), a field controller, a computer workstation, a client device, or any other system or device that receives and processes monitored variables from connected equipment 810.

Peer analysis system 802 may also receive system information (i.e., operation data) from additional BMSs, such as BMS 822 and BMS 824, or any number of BMS systems connected to peer analysis system 802 via network 446. Peer analysis system 802 may use the monitored variables and/or the equipment status information of operation data 828 provided to it to identify connected equipment 810. In particular, the peer analysis system 802 may generate one or more peer groups of systems or pieces of connected equipment 810 and equipment and/or systems in other connected BMS systems, generate peer metrics for each member of the peer group, and perform weighted outlier detection processes using the peer metric(s) to detect one or more outliers in the peer groups.

Peer analysis system 802 may also send outlier(s) 818 to service technicians 820. In some embodiments, service technicians 820 based on outlier(s) 818 may also be provided with and/or perform an automated action 834 to correct the operating performance of one of the plurality of HVAC assets. For example a maintenance request for a specific outlier unit. Still in other embodiments, automated action 834 generated by peer analysis system 802 may be automatically applied to BMS 806 and/or the other systems connected to peer analysis system 806. For example, peer analysis system 802 may instruct BMS 802 to alter one or more monitored variables and/or setpoints for connected equipment 810 in building 10.

Figure 9:
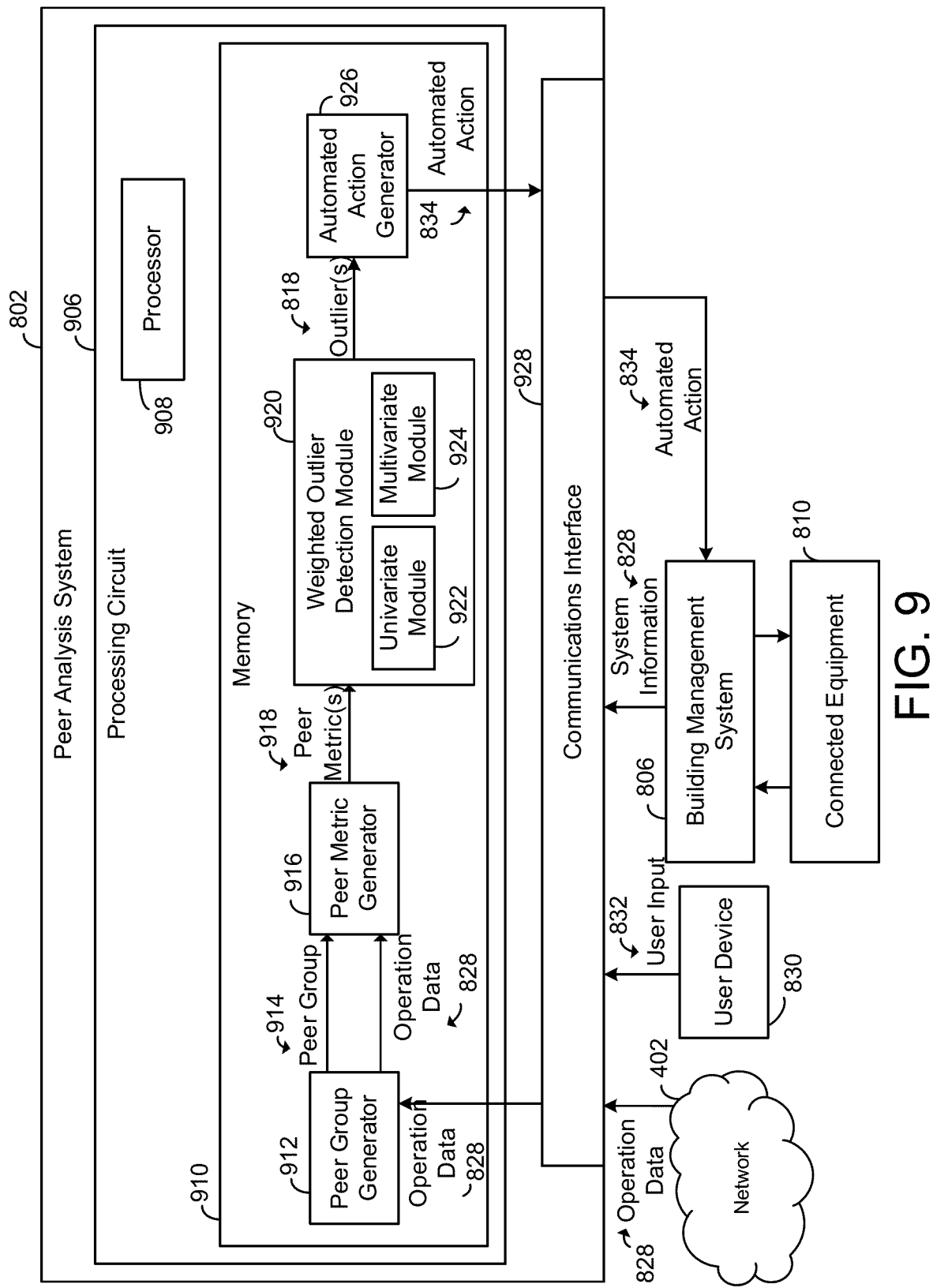
FIG. 9 is a block diagram of a peer analysis system 802 connected to the building system 800 of FIG. 8, according to some embodiments.

Referring now to FIG. 9, a block diagram 900 illustrating peer analysis system 802 in greater detail is shown, according to some embodiments. Peer analysis system 802 is shown to include peer group generator 912, peer metric generator 916, weighted outlier detection module 920 and automated action generator 926 for detecting one or more outliers in a peer group, according to some embodiments. For example, peer analysis system 802 may detect underperforming VRF systems in a peer group of all VRF systems operated in a peer group of all VRF systems in a geographic region.

Peer analysis system 802 is shown to include a communications interface 928 and a processing circuit 906 having a processor 908 and memory 910, according to some embodiments. In some embodiments, communications interface 928 facilitates communications between peer analysis system 802, BMS 806, connected equipment 810 (e.g., HVAC asset 100, VRF system 600, etc.). In some embodiments, connected equipment 810 includes one or more sensors for collecting operation data 828 as described above. The sensors may be temperature sensors, pressure sensors, infrared sensors, presence sensors, etc. In some embodiments, the sensors provide the operation data 828 to communications interface 928 and/or network 446. In some embodiments, communication interface 804 facilities communications between peer analysis system 802 and a database connected to network 446, containing operation data 828 for one or more systems in a network of systems (e.g., all buildings operated by a user, all VRF systems operated by a user, etc.), or for example shown in FIG. 8 as BMS 822 and BMS 824.

Communications interface 928 can be or include wired or wireless communications interfaces (e.g., jacks, antennas, transmitters, receivers, transceivers, wire terminals, etc.) for conducting data communications with devices included in connected equipment 810 or other external systems or devices or databases, according to some embodiments. In some embodiments, communications via communications interface 928 can be direct (e.g., local wired or wireless communications) or via a communications network (e.g., a WAN, the Internet, a cellular network, etc.). For example, communications interface 928 can include an Ethernet card and port for sending and receiving data via an Ethernet-based communications link or network. In another example, communications interface 928 can include a Wi-Fi transceiver for communicating via a wireless communications network. In yet another example, communications interface 928 can include cellular or mobile phone communications transceivers.

Still referring to FIG. 9, processing circuit 906 can be communicably connected to communications interface 928 such that processing circuit 906 and the various components thereof can send and receive data via communications interface 928, according to some embodiments. Processor 908 can be implemented as a general purpose processor, an application specific integrated circuit (ASIC), one or more field programmable gate arrays (FPGAs), a group of processing components, or other suitable electronic processing components, according to some embodiments.

Memory 910 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application, according to some embodiments. In some embodiments, memory 910 can be or include volatile memory or non-volatile memory. Memory 910 can include database components, object code components, script components, or any other type of information structure for supporting the various activities and information structures described in the present application, according to some embodiments. According to some embodiments, memory 910 is communicably connected to processor 908 via processing circuit 906 and includes computer code for executing (e.g., by processing circuit 906 and/or processor 908) one or more processes described herein.

Still referring to FIG. 9, memory 910 is shown to include a peer group generator 912, a peer metric generator 916, a weighted outlier detection module 920 and an automated action generator 926. In some embodiments, peer group generator 912 is configured to receive operation data 828 and/or directions from user device 830 via communications interface 928, analyze the operation data 828, generate using the operation data 828 one or more peer group(s) 914 of systems or pieces of equipment grouped together according to one or more common characteristics, and provide the peer group(s) 914 to peer metric generator 916. Peer group(s) 914 indicates a way in which a plurality of systems or pieces of equipment can be grouped for peer analysis, according to some embodiments. Depending on the analytical need and data available, different types of peer groups can be defined according to different criteria (e.g., manufacturer, geographic area, business type, equipment type, equipment age, system operator, client, etc.). For example, separate peer groups can be generated for indoor units (IDUs), outdoor units (ODUs), refrigeration and cooling units (RCUs), and/or total systems for performing peer analysis.

In some embodiments, peer group generator 912 is configured to receive operation data 828 from communications interface 928 and analyze the operation data 828 to identify systems and/or pieces of equipment. The operation data 828 can include identifying information (e.g., model numbers, location, owner, operator, equipment type, etc.) and historical values (e.g., temperature set points, measured temperature values, compressor cycle times, etc.), according to some embodiments. In some embodiments, the operation data 828 includes additional data types or combinations of data types.

In some embodiments, peer group generator 912 is configured to identify one or more peer group(s) 814 according to user input 832 received via communications interface 928 from user device 830. In some embodiments, user device 830 is the same and/or similar too client device 448. User device 830 may be any type of device that allows a user to select peer groups to be identified. For example, user device 830 may be a smart phone, a laptop, a desktop computer, a smart watch, a tablet, etc. In some embodiments, user device 830 connects to a network interface that facilities communication between user device 830 and peer analysis system 802, for example via network 446. In some embodiments, user device 830 may communicate with Peer analysis system 802 vie the Internet, Wi-Fi, Bluetooth, etc.

Still in other embodiments, peer group generator 912 may be configured to identify predefined peer groups automatically. For example, peer group generator 912 can analyze operation data 828 and determine it includes data relating to VRF systems. Peer group generator 912 can then automatically identify IDU, ODU, and system peer groups for the VRF systems. In some embodiments, the predefined peer groups are defined by a user via user device 830 during commissioning of the Peer analysis system 802. Peer analysis system 802 and/or network 446 may include information relating to common peer groups that should be automatically identified by peer group generator 912.

Peer group generator 912 can be configured to output peer group(s) 914 to peer metric generator 916, according to some embodiments. In some embodiments, peer group(s) 914 includes one or more peer groups. In some embodiments, the peer groups may overlap. For example, a peer group for indoor units in VRF systems may be generated, as well as a peer group for all VRF systems, which includes the indoor units as well as other units. In other embodiments, peer group(s) 914 includes a single peer group selected for analysis by a user. In some embodiments, peer group generator 912 outputs peer group(s) 914 and the operation data 828 used to generate the peer group(s) 914 to peer analysis system 802.

Figure 10:
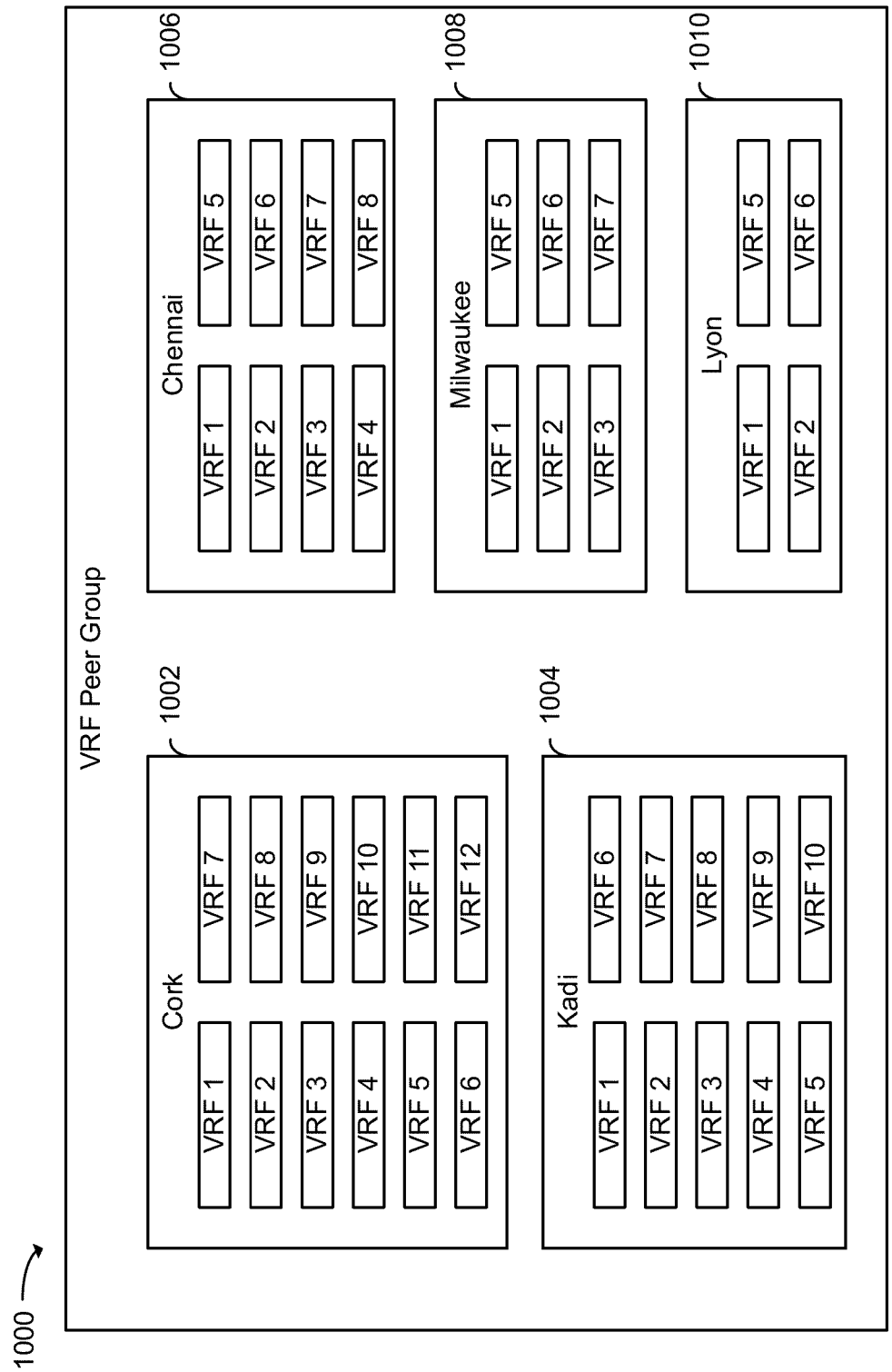
FIG. 10 is an example of a peer group generated by the peer group generator of FIG. 9, according to some embodiments.

Referring now to FIG. 10, an example of a peer group is shown, according to some embodiments. FIG. 10 is shown to include a VRF peer group 1000, according to some embodiments. In some embodiments, as shown VRF peer group 1000 includes VRF systems from multiple locations, such as Cork 1002, Kadi 1004, Chennai 1006, Milwaukee 1008, and Lyon 1010. As shown, some locations may have more VRF systems included in the peer group than others. In some embodiments, the VRF systems in the peer group are all grouped based on being from the same manufacturer. In other embodiments, the VRF systems all belong to the same client. Any number of common characteristics or criterias based on the operation data 828 can be used to generate a peer group. While shown as a peer group of VRF systems, the peer groups can include other systems such as HVAC assets, lighting systems, etc. Still, in some embodiments the peer groups may function at an equipment level, and be composed of individual pieces of equipment. For example, a peer group may be generated including all indoor units in Cork. Referring still to FIG. 10, each VRF unit can be identified from the operation data 828 by the peer group generator 912, according to some embodiments.

Referring back to FIG. 9, peer group(s) 914 is provided as an input to peer metric generator 916, according to some embodiments. Peer metric generator 916 generates peer metric(s) 918 for each member of peer group(s) 914 and provides peer metric(s) 918 to weighted outlier detection module 920 which analyzes the peer metrics to detect one or more outliers, shown as outlier(s) 818. In some embodiments, peer metric generator 916 is configured to collect peer group(s) 914, and generate peer metric(s) 918. In some embodiments, peer group(s) 914 includes the operation data 828, from systems and/or pieces of equipment such as connected equipment 810, used to generate peer group(s) 914. In some embodiments, peer metric generator 916 is configured to generate peer metric(s) 918 for a predetermined period of time. For example, a peer metric for a peer group of all outdoor units located in Cork can be calculated for June through August of a given year. The period of time can be days, months, years, etc. In some embodiments, the peer metrics generated by peer metric generator 916 depends on characteristics of the peer group(s) 914. For example, specific peer metrics may apply for a peer group of IDUs, a peer group of ODUs, a peer group of RCUs, etc. In some embodiments, only a single peer metric is generated, and outlier detection is performed on the values of the peer metric generated for that peer group. In some embodiments, multiple peer metrics are generated and outlier detection is done across using multiple peer metrics. In some embodiments, the different peer metrics are calculated based on the same data in operation data 828. Still in other embodiments, the different peer metrics are based on different data in operation data 828. For example, in univariate outlier detection process, only a single peer metric is generated and its values compared, whereas in a multivariate outlier detection process multiple peer metrics are generated and compared.

In some embodiments, weighted outlier detection module 920 performs weighted outlier detection process to account for small or uncertain data sets. In some embodiments, weighted outlier detection module 920 can perform peer analysis on a single peer metric using a univariate outlier detection process. A univariate outlier detection process analyzes a data set in a single feature space. In some embodiments, weighted outlier detection module 920 can perform peer analysis on two or more peer metrics using a multivariate outlier detection process. A multivariate outlier detection process can find outliers in a n-dimensional space of n features. While peer analysis system 802 is shown to generate outlier(s) 818 via weighted outlier detection module 920, in some embodiments weighted outlier detection module 920 may not detect any outliers, and no outlier(s) 818 will be provided to automated action generator 926.

Automated action generator 926 is shown to receive outlier(s) 818 from weighted outlier detection module 920, according to some embodiments. In some embodiments, automated action generator 926 uses outlier(s) 818 to generate appropriate automated or corrective actions, shown as automated action 834, for systems and/or pieces of equipment in peer group(s) 914. In some embodiments, the automated action 834 is directed towards outlier(s) 818 of peer group(s) 914. In other embodiments, the automated action generator 926 is directed towards systems and/or pieces of equipment in peer group(s) 914 apart from outlier(s) 818. Still in other embodiments, the automated action be directed towards the entire peer group. automated action generator 926 can analyze the outlier(s) 818 to determine if any automated action should be initiated and if so what that action should be. An automated action can refer to any action taken to address an outlier system and/or piece of equipment, or the peer group the outlier is contained within. Automated action may include for example, providing and/or receiving maintenance to a system and/or device, distributing notifications/alerts to a user device to indicate to a user that an outlier is detected, operating systems and/or equipment (e.g., connected equipment 810), disabling systems and/or equipment (e.g., connected equipment 810), automatically scheduling a maintenance activity to be performed on systems and/or equipment, logging the outlier in a database, running a successive peer analysis, generating new peer groups, generating new peer metrics, etc.

Example Peer Metrics for a VRF System

The following are example peer metrics for a model VRF system, such as VRF system 600, that can be generated by peer metric generator 916 for peer group(s) 914 using the operation data 828, according to some embodiments.

In some embodiments, the operation data 828 includes measurement temperature ($T_m$) and set-point temperature ($T_s$) for calculating a temperature control error peer metric. Temperature control error describes how well a system and/or piece of equipment tracks a set-point temperature. Temperature control error ($T_e$) is represented as:

$$T_e = |T_m - T_s| \tag{Eq 1}$$

In some embodiments, an average temperature control error and standard deviation of the temperature control error are considered as the peer metrics representing temperature control:

$$\overline{T_e} \tag{Eq. 2}$$

$$\sigma(T_e) \tag{Eq. 3}$$

In some embodiments, the operation data 828 includes the amount of change in an actuation signal, where the change is the change in a flow coefficient for calculating control effort peer metrics. A control effort peer metric represent the control effort required to track the set-point temperature over time. In some embodiments, to evaluate control effort, four peer metrics can be defined as follows, where $\overline{CV}$ denotes CV average and T denotes the summation of time intervals during thermal-on status for the VRF system 600.

$$\frac{\sum |\Delta CV|}{\overline{CV}} * (T)^{-1} \tag{Eq. 4}$$

$$\frac{\sum |\Delta CV|}{CV_{100\%}} * (T)^{-1} \tag{Eq. 5}$$

$$\overline{CV} \tag{Eq. 6}$$

$$\sigma(CV) \tag{Eq. 7}$$

The difference between the first two peer metrics is the value of the denominator or the normalization method, Each VRF system may have different expansion valve model, and the four control effort metrics are provided to accommodate the various valve models. Accordingly, CV values can be computed differently and different normalization metrics adjust the measured values, in some embodiments. In the peer metric of Eq. 4, the measured values are normalized by an average CV and in the metric of Eq. 5, the measured value is normalized by the maximum CV value. In addition, control effort peer metrics can include an average and standard deviation for CV shown in Eq. 6 and Eq. 7 respectively.

In some embodiments, the operation data 828 includes the absolute discharge pressure ($P_d$) and the absolute suction pressure ($P_s$) for calculating a compression ratio (CR) peer metric. The compression ratio can be used to represent compressor reliability and the coefficient of performance (COP) for a given system and/or piece of equipment. In some embodiments, the absolute suction pressure and the absolute discharge pressure are gauge pressures and atmospheric pressure should be added to have the absolute pressure. The compression ratio CR may be represented as:

$$CR = \frac{P_d + 0,1}{P_s + 0.1} \tag{Eq. 8}$$

In some embodiments, the operation data 828 includes the off time (OFT) and on time (OT) of one or more compressors, for calculating the cycle time (CT):

$$CT = OT + OFT \tag{Eq. 9}$$

In some embodiments the operation data 828 also includes the number of off times in a period of time (NOF), the number of cycles (NC), and the number of cycles of a certain length of time (NCT) for one or more compressors for calculating a compressor cycle time peer metric. For example, the period of time can be five minutes, and the operation data 828 can include the number of off times within five minutes, and the length of time can be ten minutes, such that NCT is the number of cycle times less than ten minutes. The compressor cycle peer metrics defined below illustrate the Off Time Percentage (OFTP) and the Cycle Time Percentage (CTP):

$$OFTP = 100 * \frac{NOF}{NC} \quad \text{(Eq. 10)}$$

$$CTP = 100 * \frac{NCT}{NC} \quad \text{(Eq. 11)}$$

Compressor cycle peer metrics can represent when one or more compressors are short cycling and/or other problems with compressors such as oversized systems, iced evaporator coils, clogged air filters, and/or low refrigerant.

In some embodiments, the operation data 828 includes the heat output for the compressor (Q) and the power supplied to the compressor (W) for calculating an efficiency or coefficient or performance (COP) for a VRF system. The value of the COP peer metric can be calculated for each system, as well as a value of a COP average peer metric and a COP standard deviation peer metric, as shown below:

$$COP = \frac{|Q|}{W} \quad \text{(Eq. 12)}$$

$$\overline{COP} \quad \text{(Eq. 13)}$$

$$\sigma(COP) \quad \text{(Eq. 14)}$$

In some embodiments, the peer metrics generated are based on the peer group(s) 914. For example, for IDUs the temperature control error and control effort peer metrics can be includes, for ODUs the compression ratio and compressor cycling peer metrics can be calculated, and for system-level peer groups the system efficiency or COP peer metrics can be calculated. While only the above peer metrics are described, a person of ordinary skill in the art would understand that peer analysis can include other peer metrics for other systems and/or pieces of equipment without departing from the scope of the present disclosure.

Weighted Outlier Detection

Referring back to FIG. 9, weighted outlier detection module 920 is shown to receive peer metric(s) 918 and operation data 828 from peer metric generator 916, according to some embodiments. Weighted outlier detection module 920 performs univariate and/or multivariate outlier detection processes to identify outliers in the peer group(s) 914. Specifically, in some embodiments weighted outlier detection module 920 performs weighted outlier detection, wherein each peer metric value for each member of the peer group is assigned a weight based on the data and then outlier detection is performed using the set of weighted peer metric values and modified detection methods. Weighting the peer metric values reduces the effect of peer metric values based on uncertain or small amounts of data on the outlier detection process. In some embodiments, the weight assigned to peer metric values for a peer in the peer group is the same for each peer metric. For example, the amount of operation data obtained from Peer A in a peer group may be consistent across the various peer metrics, such that the weight calculated for each of the values of the peer metrics of Peer A based on the operation data is also consistent across the types of peer metrics. Furthering the example, Peer B in the same peer group may have a different amount of operation data, and therefore the weight assigned to the values each peer metric for Peer B, while being the same across all peer metric types for Peer B, will differ from the weight assigned to Peer A.

Weighted outlier detection module 920 is shown to include univariate module 922 and multivariate module 924. In some embodiments, weighted outlier detection module 920 receives the peer metric(s) 918 and passes peer metric(s) 918 to univariate module 922 and/or multivariate module 924. In some embodiments, both univariate module 922 and multivariate module 924 process the peer metric(s) 918 and detect outlier(s) 818. For example, univariate module 922 may perform univariate outlier detection for a temperature control error peer metric, and multivariate module 924 may perform univariate outlier detection outliers in the temperature control error and control effort space. In some embodiments, X is the set of values for the peer metrics available for outlier detection and is defined as:

$$X_{n \times p} = \begin{bmatrix} x_{11} & \cdots & x_{1p} \\ \vdots & \ddots & \vdots \\ x_{n1} & \cdots & x_{np} \end{bmatrix} \quad \text{(Eq. 15)}$$

where n is the number of peers (i.e., HVAC assets) in the peer group and p is the number of peer metrics calculated per peer.

In some embodiments, univariate module 922 performs univariate outlier detection on X. When data is univariate, only a single peer metric per peer is tested such that p=1, therefore X is defined as:

$$X_{n \times 1} = \begin{bmatrix} x_{11} \\ \vdots \\ x_{n1} \end{bmatrix} \quad \text{(Eq. 16)}$$

In some embodiments, the univariate outlier detection test is a Generalized Extreme Studentized Deviate (GESD) test. Still in other embodiments, other univariate outlier tests may be used. For example, the Wilk's Test and modified Wilk's Test explained in further detail below can also be used to detect univariate outliers when using a univariate data set.

In general, a GESD test may detect one or more outliers in a univariate sample data set $X_{n \times 1}$ for a peer metric that follows an approximately normal distribution, wherein the sample size n (i.e., number of values calculated, which in a univariate data set corresponds to the number of peers in the peer group) is greater than 25 and $x_i$ is the $i^{th}$ value of the peer metric in the peer group represented by X. In a GESD test a maximum number of outliers r is hypothesized, and a test statistic $R_i$ based on a select value $x_i$ is tested against a critical value $\lambda_i$ to see if it is an outlier as compared to the other values of the peer metric of the same peer group. If the value $x_i$ is an outlier, the value $x_i$ is removed from the data set, and the procedure is then repeated with n−1 values, until the procedure is performed for r number of outliers. In other words, the GESD test performs r separate tests including a test for one outlier, a test for two outliers, a test for three outliers . . . up to a test for r outliers. The number of outliers is the largest i such that $R_i > \lambda_i$.

The maximum number of outliers can be defined as r, which in some embodiments may be determined as represented below, where n is the number of values for the peer metric in the set defined by the peer group:

$$r = \text{floor}\left[\frac{n-1}{2}\right] \quad \text{(Eq. 17)}$$

Still in other embodiments r may be computed using other methods of approximation. The test statistic $R_i$ for a GESD test can be represented as shown below, where $\overline{X}$ and s denote the sample mean and the sample standard deviation respectively:

$$\overline{X} = \frac{\sum_{i=1}^{n} x_i}{n} \quad \text{(Eq. 18)}$$

$$\sigma^2 = \frac{\sum_{i=1}^{n}(x_i - \overline{X})^2}{n-1} \quad \text{(Eq. 19)}$$

such that the test statistic $R_i$ is defined as:

$$R_i = \frac{\max|x_i - \overline{X}|}{s} \quad \text{(Eq. 20)}$$

In the sequential steps of a GESD test, the peer metric value that maximizes $|x_i-\overline{X}|$ is removed, and a new test statistic $R_{i+1}$ is computed with a new sample set of n−1 values, and the process repeats until r tests have been performed, generating a set of r test statistics $\{R_1 \ldots R_r\}$. Similarly, a number of r critical values can be computed for comparing to the test statistics. In some embodiments, the critical values are represented as follows for i=1, 2, . . . r:

$$\lambda_i = \frac{(n-i)t_{p,n-i-1}}{\sqrt{(n-i-1+t^2_{p,n-i-1})(n-i+1)}} \quad \text{(Eq. 21)}$$

where $t_{p,n-i-1}$ is the percentage point from the t-distribution with a degree of freedom represented by n−i−1 and p is represented as shown below, with a as a significance level chosen for the GESD test:

$$p = 1 - \frac{\alpha}{2(n-i+1)} \quad \text{(Eq. 22)}$$

The number of outliers is the largest i such that $R_i > \lambda_i$, with the outliers being the values that at each step maximized $|x_i-\overline{X}|$ up to the largest such i. For example, referring to the example set of test statistics and critical values in the table below where r=4:

| i | Peer Metric Value max $\|x_i - \overline{x}\|$ ($x_{i,extreme}$) | Test Statistic ($R_i$ vs $\lambda_i$) | Significant? |
|---|---|---|---|
| 1 | $x_{1,extreme}$ | $R_1 > \lambda_1$ | Yes |
| 2 | $x_{2,extreme}$ | $R_2 > \lambda_2$ | Yes |
| 3 | $x_{3,extreme}$ | $R_3 < \lambda_3$ | No |
| 4 | $x_{4,extreme}$ | $R_4 > \lambda_4$ | Yes |

The table shows that at i=4, $R_4 > \lambda_4$ and therefore there are four outliers, the set of values that for each i up to i=4, $\{x_{1,extreme}, x_{2,extreme}, x_{3,extreme}, x_{4,extreme}\}$ maximize $|x_i-\overline{X}|$. As shown, although $R_3 < \lambda_3$, $x_{3,extreme}$ and is not considered significant, it is still considered an outlier because all values up to the largest i such that $R_i > \lambda_i$ are outliers in the GESD test, which as shown above is true of $x_{4,extreme}$.

Figure 11A:
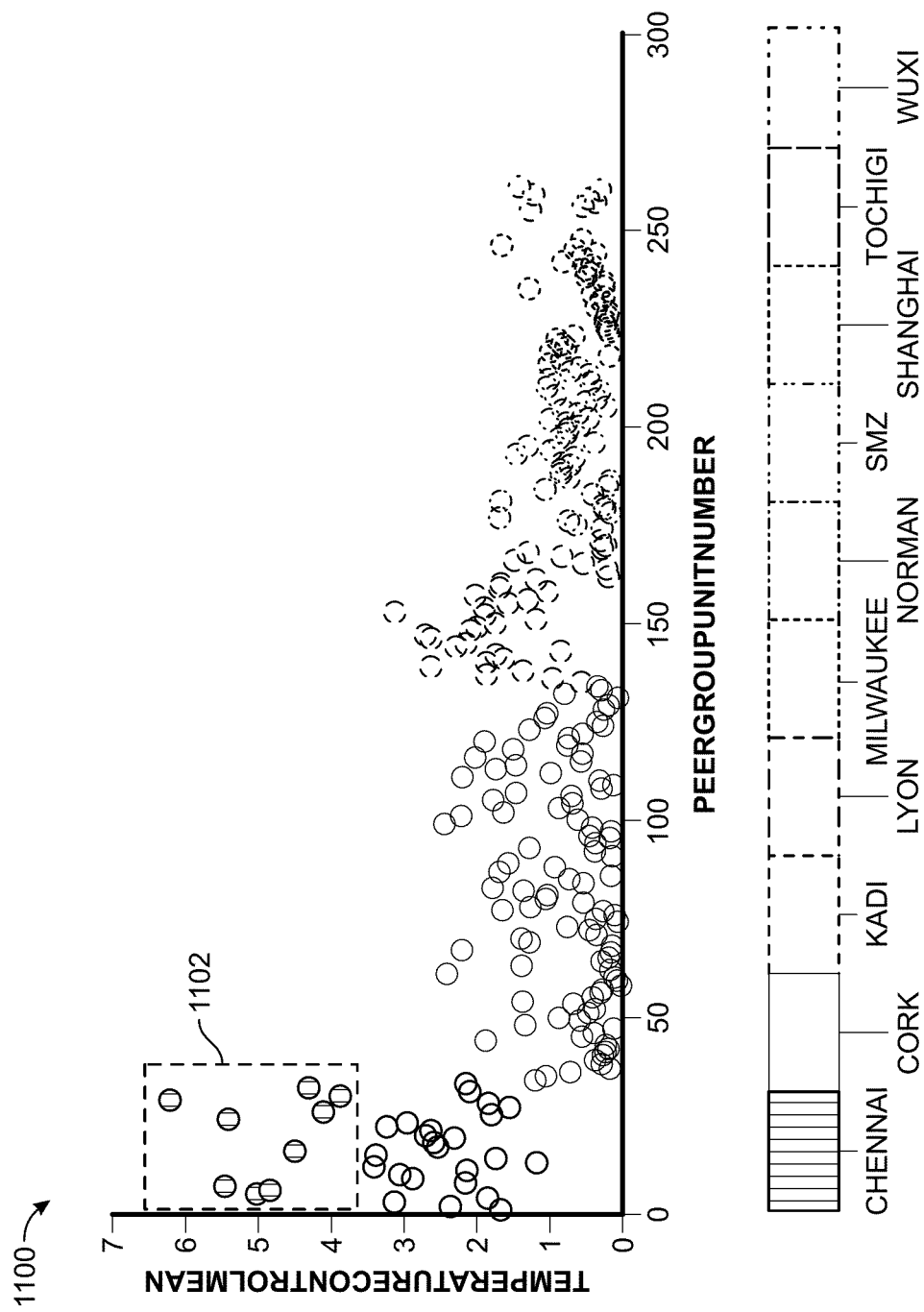
FIG. 11A is a graph illustrating relating a number of IDUs to a temperature control mean peer metric, according to some embodiments.
Figure 11B:
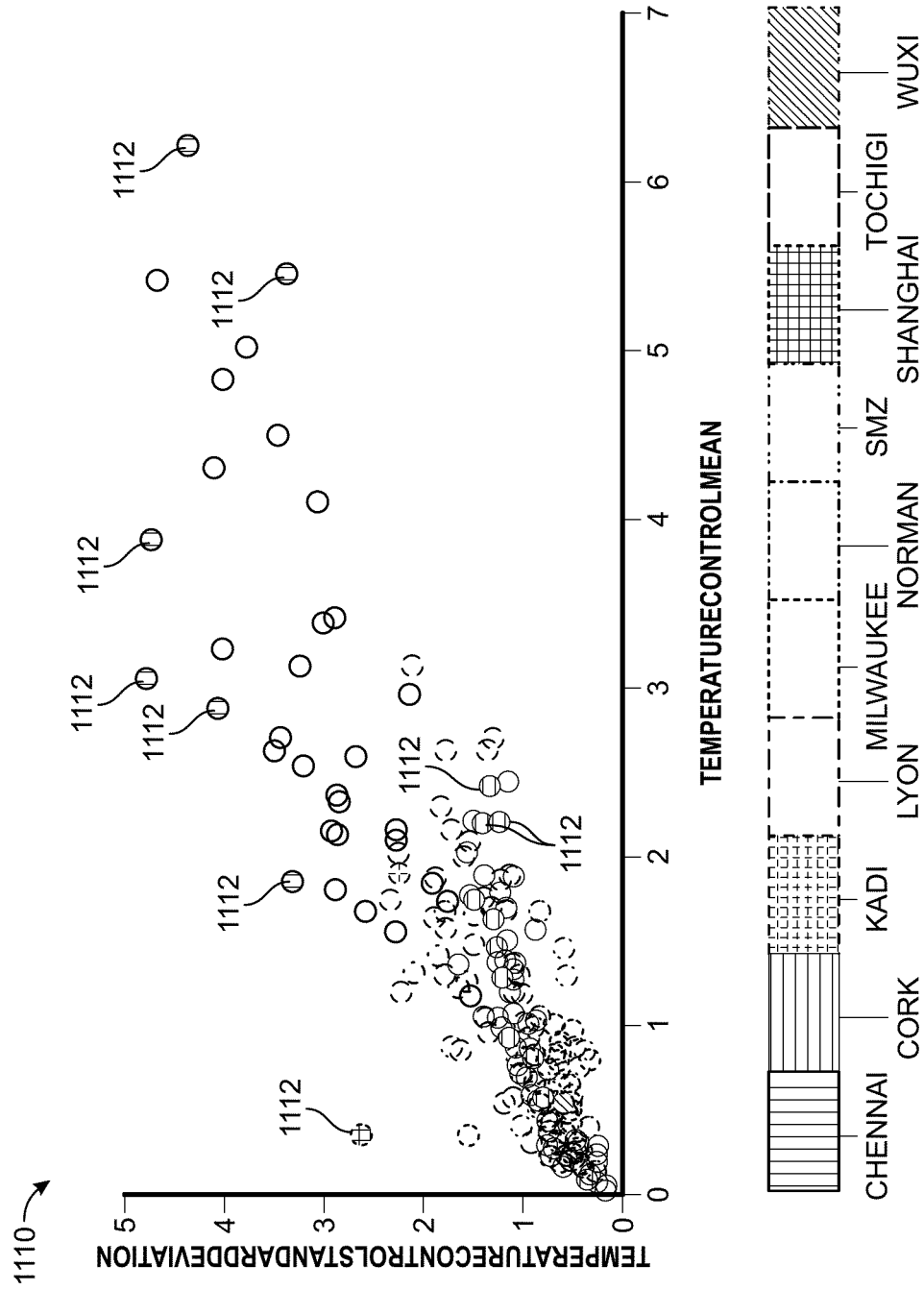
FIG. 11B is a graph illustrating relating a temperature control standard deviation to a temperature control mean, according to some embodiments.

Referring now to FIG. 11A, an example graph relating a number of VRF systems to a temperature control mean peer metric is shown, according to some embodiments. Graph 1100 can illustrate the outliers identified by univariate outlier detection process performed by univariate module 922 on a peer group of all VRF units in Chennai, Cork, Kadi, Lyon, Milwaukee, Norman, SMZ, Shanghai, Tochigi, and Wuxi. Outliers are shown in outlier zone 1102 of graph 1100, which shows the outliers detected to be 9 VRF systems from the entire peer group.

Referring back to FIG. 9, in some embodiments, univariate module 922 performs a weighted GESD test. In the weighted GESD Test, the normal GESD test is modified to account for weights assigned to the values of the chosen peer metric based on the amount of data the values of the peer metrics are generated from. Similarly the test statistic is modified to account for the weights as shown below. A weighted GESD can be configured to more accurately identify outliers in circumstances where data collection methodologies lead to uncertain or limited data sets.

In some embodiments, the weighted GESD test statistic is modified to include weights for each value of the peer metric in the set x as shown below:

$$R_{wi} = \frac{\max(w_i|x_i - \overline{X_w}|)}{\sigma_w} \quad \text{(Eq. 23)}$$

where $\overline{X_w}$ is the weighted mean and $\sigma_w^2$ is weighted variance:

$$\overline{X_w} = \frac{w_1 x_1 + w_2 x_2 + \ldots + w_n x_n}{\sum_{i=1}^{n} w_i} \quad \text{(Eq. 24)}$$

$$\sigma_w^2 = \frac{\sum w_i(x_i - \overline{X_w})^2}{\frac{n-1}{n}\sum w_i} \quad \text{(Eq. 25)}$$

and where the weight $w_i$ of a given value $x_i$ can be represented in some embodiments as:

$$w_i = \frac{\text{number of available data for calculating } x_i}{\text{mean(number of available data for calculating } x)} \quad \text{(Eq. 26)}$$

In some embodiments, the weight $w_i$ is bounded by the limit represented below, such that the weight $w_i$ for a given value is the minimum between 1 and $w_i$ as calculated in Eq. 26 such that:

$$w_i(w_i > 1) = 1 \quad \text{(Eq. 27)}$$

In some embodiments, the number of available data for calculating the value $x_i$ is determined from operation data 828. For example, considering an average temperature control error peer metric for a first VRF system in a peer group, $x_1 = \overline{T}_{e,1}$ may be computed based on 100 individual data points contained in the operation data 828 for the measurement temperature and the set-point temperature, where as $x_2=\overline{T}_{e,2}$ may be computed based on only 50 individual data points for the measurement temperature and the set-point temperature. In the example if $x_1$ and $x_2$ each relate to the only members in a peer group, the weight assigned $x_1$ will be $$w_1 = \frac{100}{75} = 1.\overline{33}, w_1(w_1 > 1) = 1$$

therefore $w_1=1$ and the weight assigned to $x_1$ will be $$w_2 = \frac{50}{75} = 0.\overline{66}.$$

Therefore, when calculating the test statistic, $x_1$ will be weighted more than $x_2$, and the modified GESD test can be performed as weighted towards $x_1$ to better account for the uncertainty in the underlying data.

Referring now to FIG. 1113, an example graph relating a temperature control standard deviation to a temperature control mean is shown, according to some embodiments. Graph 1110 can illustrate the outliers identified by a multivariate outlier detection process performed by multivariate module 924. Particularly, outliers are shown as outliers 1112.

Referring back to FIG. 9, in some embodiments, peer analysis system 802 performs multivariate outlier detection on $X_{n \times p}$ with multivariate module 924. Multivariate outliers may not be detectable when each variable in the feature space is considered independently, and therefore multivariate analysis may be necessary in some embodiments to detect all outliers. For multiverse analysis values for multiple peer metrics are calculated and compared. In some embodiments, the plurality of peer metrics belong to the same dimension. For example, multivariate analysis can be performed using temperature control peer metrics and control effort peer metrics, as they each belong to the same dimension (i.e., IDUs). Comparatively, multivariate analysis using temperature control peer metrics and compressor cycling peer metrics will not be performed as they belong to different dimensions (i.e., temperature control relates to IDUs and compressor cycling relates to ODUs). It should be appreciated that in some embodiments the dimensions are based on characteristics of the peer group.

Multivariate module 924 may perform multivariate analysis using a Sequential Application of Wilk's Multivariate Outlier Test ("Wilk's Test"). In the Wilk's Test, under the null hypothesis of no outliers all n observations are drawn from one multivariate normal distribution. Then Wilk's Statistic is computed and compared to the critical value of Eq. 21 to find the extreme observations. First, the test statistic $W_j$ is represented as:

$$W_j = \frac{|A^j|}{|A|} \quad \text{(Eq. 28)}$$

where A is the matrix of the sum of squares and products for the deviation scores of the values in data matrix $X_{n \times p}$ containing the multivariate set of values for the per metrics defined as:

$$A = \Sigma_{i=1}^{n}(x_i-\bar{x})(x_i-\bar{x}) \quad \text{(Eq. 29)}$$

and $A^j$ is the corresponding matrix with $x_j$ eliminated from the sample giving a reduced sample of n−1 points. In some embodiments, the potential outlier, for example the value l, is the value which maximizes the test statistic $W_j$. This can also be expressed as the value whose removal leads to the greatest reduction in |A|, which is the same as the value whose removal minimizes $W_j$. Wilk's Statistic $D_1$ can then be represented as:

$$D_1 = \min_j(W_j) = \min\left(\frac{|A^l|}{|A|}\right) \quad \text{(Eq. 30)}$$

which can be rewritten and simplified to be expressed as:

$$D_1 = 1 - \frac{n}{n-1}*W_j = 1 - \frac{n}{n-1}(x_l-\bar{x})'A^{-1}(x_l-\bar{x}) \quad \text{(Eq. 31)}$$

In Wilk's Test, the ratio $W_j$ follows a beta distribution:

$$W_j \sim \text{beta}\left\{\frac{(n-p-1)}{2}, \frac{p}{2}\right\} \quad \text{(Eq. 32)}$$

Using the Bonferroni bound, the values of the peer metrics can be tested for significance level at $$100\alpha/n.$$

These values can be obtained by using:

$$\left(1 + \frac{p}{n-p-1}F_{p,n-p-1,(1-\alpha/n)}\right)^{-1} \quad \text{(Eq. 33)}$$

Wilk's Test can compute the above values for different confidence levels a. To check $x_l$ is an outlier, the Wilk's Statistic $D_1$ can be computed and compared to the critical value of Eq. 21. In some embodiments, if $D_1 < \lambda_l$, than $x_l$ is an extreme observation and an outlier. Once the extreme observation has been identified, that observation is removed and the Wilks's procedure is repeated for n−1 observations.

In some embodiments, the Wilk's Test above is modified to weight the values of the peer metrics for the peer group based on the amount of data each value is generated from to more accurately identify outliers in circumstances where data collection methodologies lead to uncertain or limited data sets. In some embodiments, the modified Sequential Application of Wilk's Multivariate Outlier Test ("modified Wilk's Test") is modified as shown below in Eq. 34-Eq. 37, with the test statistic $W_j$ still defined as;

$$W_j = \frac{|A_w^j|}{|A_w|} \quad \text{(Eq. 34)}$$

where $A_w$ is now the sample sum of squares and products matrix for the deviation scores of the data matrix $X_{n \times p}$ containing the multivariate set of values for the peer metrics multiplied by the weights of each of the values of the peer metrics such that:

$$A_w = \Sigma_{i=1}^{n}w_i(x_i-\bar{x})'(x_i-\bar{x}) \quad \text{(Eq. 35)}$$

with $A_w^j$ being the corresponding matrix with $x_j$, eliminated from the sample giving a reduced sample of n−1 points. As shown, $\bar{x}_W$, is the mean vector of the set of values X and $w_i$ is the weight calculated by Eqs. 26-27 above in reference to the weighted GESD test. As explained above, for multivariate analysis with values for multiple peer metrics per peer being calculated, in some embodiments the weights assigned to the values of different peer metrics will be the same, as they are based on the same underlying operation data. For example, the weights applied to values of a peer metric for Peer A in a peer group will be equal from one peer metric to another. In some embodiments, the potential outlier, is the value l (i.e., peer metric value) which when weighted maximizes the weighted test statistic, w*$W_j$. This can also be expressed as the value whose removal when weighted leads to the greatest reduction in $|A_w|$, which is the same as the point whose removal when weighted minimizes $W_j$. The weighted Wilk's Statistic $D_1$ can then be represented as:

$$D_1 = \min_j(W_j) = \min\left(\frac{|A_w^i|}{|A_w|}\right) \quad \text{(Eq. 36)}$$

which can be rewritten and simplified to be expressed as:

$$D_1 = 1 - \frac{n}{n-1} * D_1 = 1 - \frac{n}{n-1}(X_l - \bar{X})'A_w^{-1}(X_l - \bar{X}) \quad \text{(Eq. 37)}$$

To check $x_l$ is an outlier, the weighted Wilk's Statistic $D_1$ of the modified Wilk's Test can be computed and compared to the critical value of Eq. 21. In some embodiments, if $D_1 < \lambda_l$, than $x_l$ is an extreme observation and an outlier. Once the extreme observation has been identified, that observation is removed and the Wilks's procedure is repeated for n−1 observations.

Figure 12:
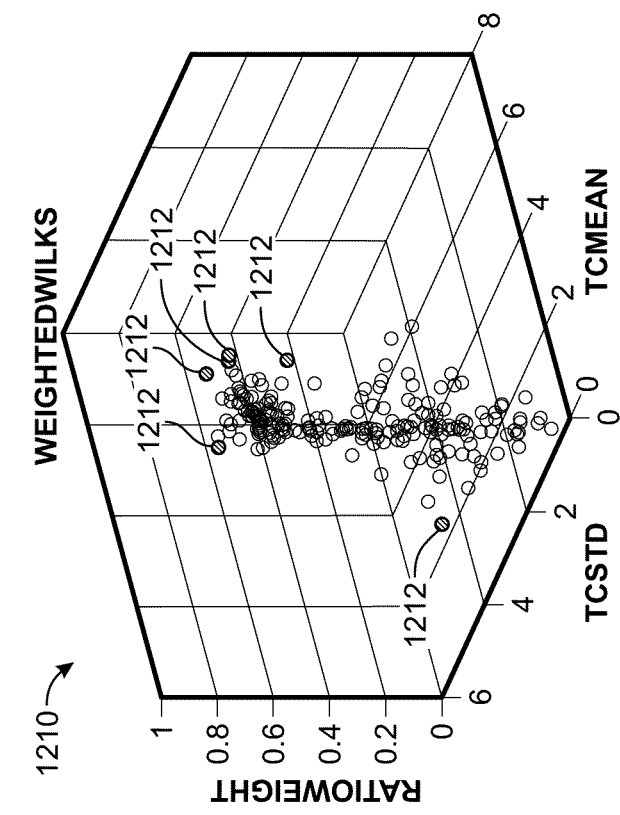
FIG. 12 is a pair of graphs illustrating an unmodified Wilk's multivariate outlier detection process to a weighted multivariate outlier detection process for a number of IDUs, according to some embodiments.
Figure 12:
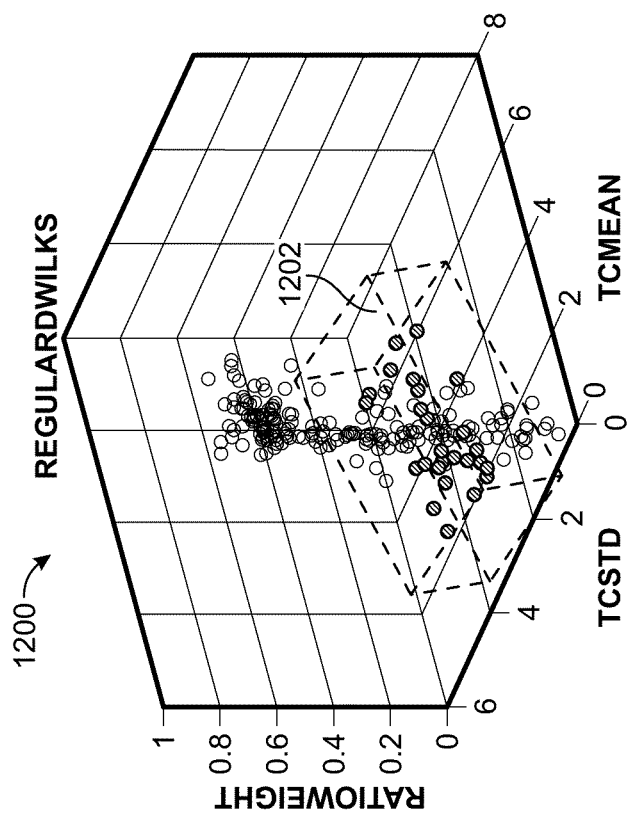

Referring now to FIG. 12, examples graphs 1200 and 1210 relating a temperature control error standard deviation to a temperature control error mean along with the weighted ratio $W_j$ are shown, with graph 1200 representing the results of the Wilk's Test and graph 1210 representing the results of the modified Wilk's Test, according to some embodiments. Graph 1200 is shown with 26 outliers in region 1202, and graph 1210 is shown with only six outliers 1212. In some embodiments, graphs 1200 and 1210 represent a peer group comprised of VRF systems, with the graphed observations corresponding to the calculated peer metrics for each member of the peer group. As shown, 25 of the 26 peer metrics values in the peer group identified as outliers by the Wilk's Test were not indicated as outliers by the modified Wilk's Test. The modified Wilk's Test found only one outlier identified by the Wilk's Test to be an outlier, and additionally found five outliers not identified by the Wilk's Test. As shown, the modified Wilk's Test significantly narrowed the set of identified outliers as compared to the unmodified Wilk's Test. Still, in some embodiments, the modified Wilk's Test may detect more outliers than the unmodified Wilk's Test.

Figure 13:
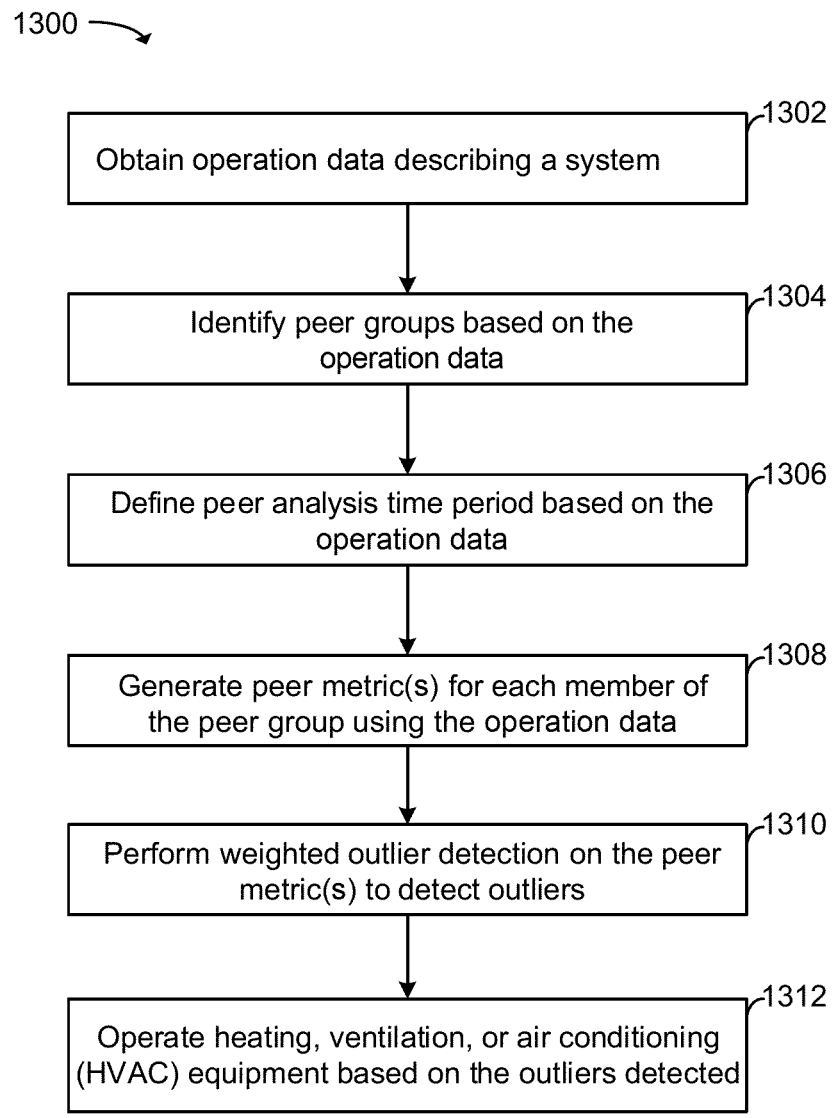
FIG. 13 is a flowchart of a peer analysis process, according to some embodiments.

Referring now to FIG. 13, a flowchart of outlier detection process 1300 for use in peer analysis is shown, according to an exemplary embodiment. Process 1300 can be carried out by the peer analysis system 802. Still in other embodiments, process 1300 can be carried out by BAS controller 366 of FIG. 4, and/or other components of BMS 400.

Process 1300 begins at step 1302, where the peer group generator 912 receives operation data 828 from communication interface 804. In some embodiments, the operation data 828 is sourced from connected equipment 810 and/or network 446. Operation data 828 may include any information pertaining to one or more systems and/or pieces of equipment, such as equipment type, system type, location, age, measured temperature, compressor on time, compressor off time, compressor cycle time, efficiency, power consumption, client, owner, operator, etc. Operation data 828 may include data relating to more than one type of system. For example, operation data 828 can include data for VRF systems 600 and waterside system 200. In some embodiments, operation data 828 includes information for multiple BMS systems.

At step 1304, the peer group generator 912 uses the operation data 828 to define one or more peer group(s) 914. Peer group(s) 914 can be based on equipment type, manufacture, age, location, operator, owner, building type, and/or any other characteristic that may be commonly held by two or more systems and/or pieces of equipment. In some embodiments, a peer group contains systems and/or pieces of equipment also contained in another peer group. For example, a peer group of VRF systems can include the IDUs and ODUs for each VRF, where the IDUs may also be included in their own peer group of IDUs. In some embodiments, the peer groups are defined by a user providing a user input 832 from user device 830 via communications interface 928. Still in other embodiments, the peer group(s) 914 are identified automatically by peer group generator 912 based on the operation data 828.

At step 1306, peer metric generator 916 receives the operation data 828 and the peer groups generated from it by peer group generator 912 and defines a peer analysis time period. The peer analysis time period limits the data from operation data 828 that peer metric generator 916 will analyze during the peer analysis process 1300. For example, operation data 828 may include data ranging from 2000-2010, however the peer analysis time period may only extend from Jun. 1, 2019 to Sep. 1, 2019. Accordingly, only data within the peer analysis time period will be used by peer metric generator 916 to generate the peer metric(s) 918. In some embodiments, the peer analysis time period is indicated by a user through user device 830 in user input 832, provided to peer metric generator 916 via communications interface 928.

At step 1308, peer metric generator 916 generates one or more peer metric(s) 918 for each member of peer group(s) 914 during the peer analysis time period using the operation data 828. In some embodiments, before peer metric generator 916 generates peer metric(s) 918, peer metric generator 916 preprocesses the operation data 828. In some embodiments, preprocessing includes removing missing data and/or filtering for data in the appropriate time range. In some embodiments, for a peer group of n members peer metric generator 916 will accordingly generate n values for each peer metric that is being generated, one for each member in the peer group, each value based on data in the operation data 828 corresponding to said member. Still in other embodiments, peer metric generator 916 generates values for peer metric(s) 918 only for members of peer group(s) 914 with a sufficient amount of data. In some embodiments, the amount of data in operation data 828 for one system in a peer group may not equal the amount of data in operation data 828 for another system in the same peer group. For example, consider a peer group of HVAC assets, one each in Chennai, Cork, Milwaukee, and Kadi for a time period of June 2010 to June 2011. Operation data 828 may have a complete 12 months of measured temperature and setpoint temperature data, such that the values of the average and standard deviation of the temperature control peer metrics shown in Eq. 4 and Eq. 5 are generated by peer metric generator 916 using the complete data set. Still referencing the same example, operation data 828 may only have 8 months of measured temperature and setpoint temperature data for Kadi, due to a malfunction in Kadi's system resulting in no data being available for September 2010 through December 2010. Accordingly, the values of the temperature control peer metrics for Kadi may only be based on 8 months of data.

In some embodiments, the peer metric(s) 918 generated by peer metric generator 916 depend on the peer groups provided to peer metric generator 916 by peer group generator 912. For example, for a peer group of IDUs peer metric generator 916 may be configured to generate temperature control error and control effort peer metrics, whereas for a peer group of ODUs peer metric generator 916 may be configured to generate compression ratio and compression cycling peer metrics. In some embodiments, the peer metric(s) 918 to be generated are chosen by a user via user input 832. To enable a user to select the peer metric(s) 918, peer metric generator 916 may provide the peer metric(s) 918 corresponding to a particular peer group(s) 914 to user device 830 such that a user can select what peer metric(s) 918 to generate. Peer metric generator 916 and/or peer analysis system 802 may include functionality to generate graphical user interfaces (GUIs) that indicate the available peer group(s) 914 and peer metric(s) 918 and such GUIs can be displayed to a user on user device 830. Still in some embodiments, the peer group(s) 914 and/or peer metric(s) 918 are presented to the user via a website accessible by the user device 830. In some embodiments, the peer group(s) 914 and/or peer metric(s) 918 are presented on an application installed and/or otherwise accessible by user device 830. It should be appreciated that the peer group(s) 914 and/or peer metric(s) 918 (as well as the outlier(s) 818 as explained in further detail below) can be provided to the user via user device 830 in any appropriate fashion for obtaining peer group(s) 914 and/or peer metric 918 selections.

At step 1310, the weighted outlier detection module 920 receives the peer metric(s) 918 (i.e., the values for the selected peer metric(s)) from peer metric generator 916 and performs a weighted outlier detection process using peer metric(s) 918 to detect one or more outlier values corresponding to one or more outlier systems and/or pieces of equipment. In some embodiments, the outlier detection process is a weighted univariate outlier detection process such as a weighted GESD test performed by univariate module 922 and/or a weighted multivariate outlier detection process such as modified Wilk's Method performed by multivariate module 924, explained above with reference to FIG. 9. In some embodiments, the weights for the outlier detection processes are generated per value for each member of the peer group(s) 914, based on the number of data used to generate the peer metric value divided by the total number of data used to generate all of the values of all the peer metric(s) 918 for the entire peer group(s) 914, such as shown in Eqs. 26-27.

In some embodiments, weighted outlier detection module 920 receives user input 832 indicating what kind of outlier detection process to perform. In some embodiments, the weighted outlier detection process used depends on the peer metric(s) 918. In some embodiments, only a single peer metric 918 is generated by peer metric generator 916 and therefore multivariate module 924 will not perform a multivariate outlier detection analysis, and instead only univariate module 922 will perform a univariate outlier detection process. In some embodiments, multiple peer metric(s) 918 will be provided to weighted outlier detection module 920, and multivariate module 924 can be configured to perform a weighted multivariate outlier detection process using the peer metric(s) 918. Still in other embodiments, multiple peer metric(s) 918 are provided and both univariate and multivariate outlier detection processes are performed.

At step 1312, automated action generator 926 receives outlier(s) 818 from weighted outlier detection module 920 and operates HVAC equipment (i.e., connected equipment 810) based on the outlier(s) 818. In some embodiments, automated action generator 926 generates an automated action 834 based on outlier(s) 818. In some embodiments, the automated action 834 relates to the detected outlier. For example, the values of the compressor cycling peer metrics for a VRF may be identified as outliers by weighted outlier detection module 920, and automated action generator 926 can schedule a maintenance request for the VRF unit. Still in other embodiments, the automated action 834 can be directed towards the non-outlier members of the peer group. For example, a peer group of VRF systems in a heavily polluted location may suffer from widespread air filter clogging, and the outlier(s) 818 detected by weighted outlier detection module 920 may be VRF systems in the peer group that are actually overperforming, for example due to said systems not having a clogged air filter. Accordingly, automated action generator 926 may initiate an automated action to schedule maintenance for all VRF systems not detected as outliers, as the outlier detection processes identified over performers not under performers. In some embodiments, other automated action 834 may be initiated, such as though explained above with reference to FIG. 9 above. For example automated action generator 926 can be configured to use outlier(s) 818 for fault adaptive model predictive control of systems and/or pieces of equipment in peer group(s) 914. In some embodiments, outlier 818 can be can be used as an input in a model predictive control system for one or more BMSs. In some embodiments, the automated action 834 generated from outlier 818 in a model predictive control system can include selecting an optimal control scheme based on the outlier and adjust the operation of one or more HVAC equipment in the peer group based on the optimal control scheme, as described in U.S. patent application Ser. No. 17/388,776, filed Jul. 29, 2021, the entire disclosure of which is incorporated by reference herein.

Figure 14:
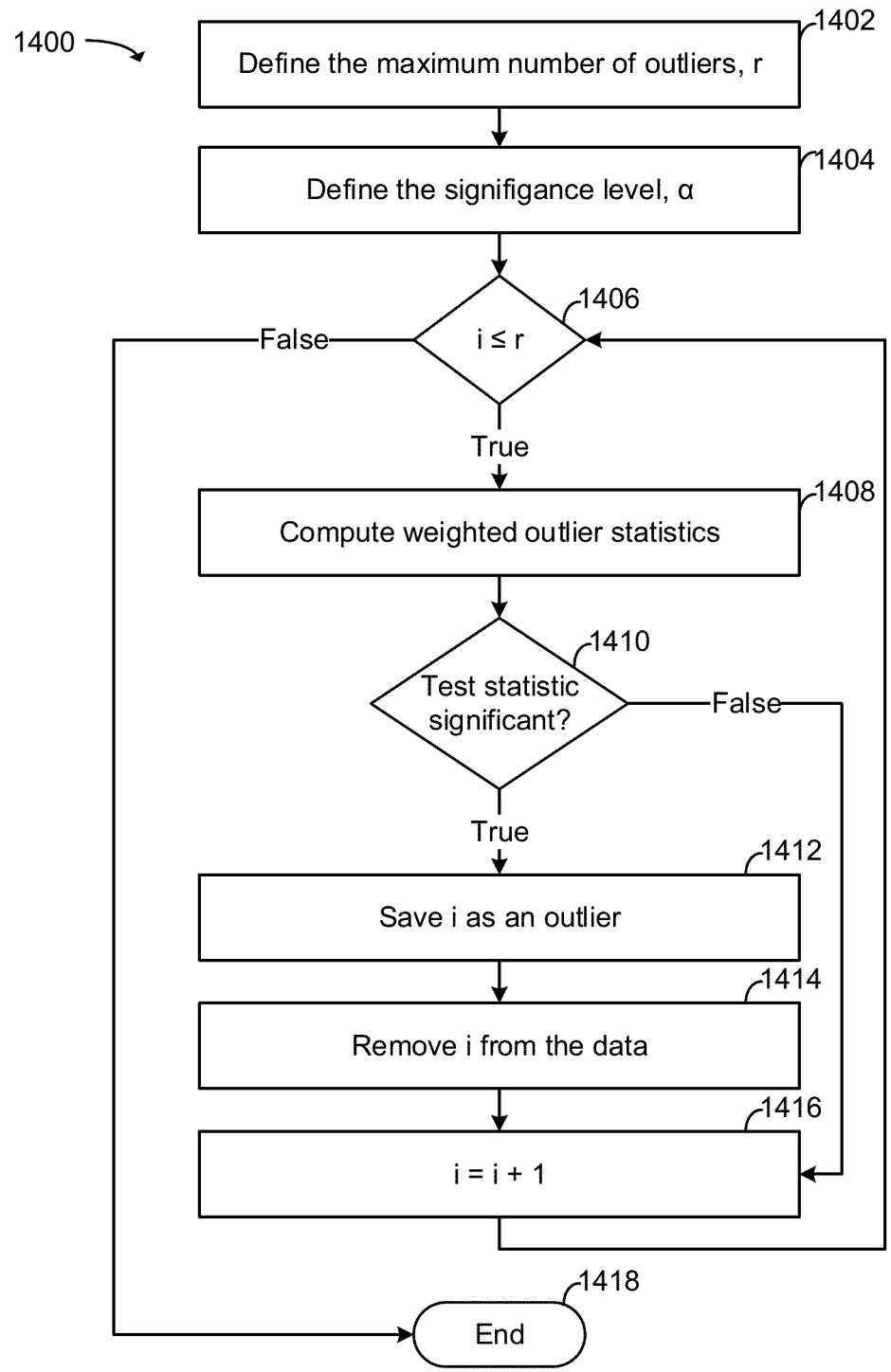
FIG. 14 is a flowchart of the outlier detection process implemented in the peer analysis process of FIG. 13, according to some embodiments.

Referring now FIG. 14, a flowchart of process 1400 for outlier detection using weighted outlier statistics is shown, according to some embodiments. Process 1400 can be carried out by the peer analysis system 802. Still in other embodiments, process 1400 can be carried out by BAS controller 366 of FIG. 4, and/or other components of BMS 400 or a remote computing system connected to network 446. Process 1400 illustrates the processes performed by weighted outlier detection module 920 as it generates outlier(s) 818 based on the values of peer metric(s) 918. In some embodiments, process 1400 illustrates univariate outlier detection performed by univariate module 922 of weighted outlier detection module 920. In some embodiments, process 1400 illustrates a multivariate outlier detection process performed by multivariate module 924 of weighted outlier detection module 920.

Process 1400 begins at step 1402, where peer analysis system 802 defines the maximum number of r outliers to be tested in one or more outlier detection processes. As explained above, for both univariate and multivariate outlier detection, the processes are sequential and performed starting at i=1 until i=r where r is the maximum number of outliers to be tested. In some embodiments, r is determined as shown in Eq. 17. In some embodiments, a user of user device 830 selects r and provides the selection to peer analysis system 802 via user input 832. Still in other embodiments, r is determined automatically based on Eq. 17 and/or other methods of approximation.

At step 1404, peer analysis module defines a significance level a. In some embodiments, the significance level a is input by a user of user device 830 and provided to weighted outlier detection module 920 in user input 832 via communication interface 804. In some embodiments, significance level a is selected from significance levels with tabulated Wilk's values.

At step 1406, process 1400 is shown to proceed in the outlier detection process so long as i is less than or equal to r. If i>r, then the outlier detection process of process 1400 has iterated for every i up to the maximum number of outliers r and process 1400 proceeds to step 1418 and ends. Once i>r, the outliers are all values, $x_i$, up the largest i such that the test statistic is less than the critical value. If at step 1406 i is less than or equal to r, process 1400 is shown proceeding to step 1408.

At step 1408, weighted outlier detection module 920 computes the weighted outlier statistics. In some embodiments step 1408 includes univariate module 922 of weighted outlier detection module 920 performing a weighted GESD test as described above with reference to FIG. 9. The weighted outlier statistics can include the weighted mean $\overline{X_w}$ of Eq. 24, the weighted variance $\sigma_w^2$ represented by Eq. 25, the weighted test statistic represented by Eq. 23, and the critical values $\lambda_i$ represented in Eq. 21 for the peer metric $x_j$ that is farthest from the weighted mean, or in other words maximizes $|x_i-\overline{X_w}|$. Still in other embodiments other test statistics may be computed for other univariate outlier detection methods. As described above with reference to FIG. 9, weighted outlier detection module 920 is configured to perform a weighted outlier detection wherein the values of peer metric(s) 918 are assigned a weight $w_i$ based on the number of data used to calculate the peer metrics compared to the number of data used to calculate all of the values of the peer metric for the peer group, as represented in Eqs. 26 and 27.

Still in other embodiments steps 1408 includes multivariate module 924 of weighted outlier detection module 920 performing a multivariate outlier detection process as described above with reference to FIG. 9. The weighted outlier statistics computed by multivariate module 924 calculate at step 1410 can include the weighted matrix $A_w$ of sum of squares and cross products for the deviation scores of the values of the peer metrics as represented by Eq. 35, the weighted test statistic $W_j$ as represented by Eq. 34, the outlier $x_j$ is that whose removal leads to the greatest reduction in $|A_w|$ when weighted which is the value that minimizes $W_j$ as represented in Eq. 36, the weighted Wilk's Statistic as represented in Eq. 37, and the critical value as represented by Eq. 21. Still in other embodiments one or more other outlier detection statistics referenced herein may be computed in step 1408 of process 1400.

At step 1410 weighted outlier detection module 920 compares the weighted Wilk's Statistic from step 1408 against the computed critical value from step 1408 to determine if the test statistic for the i is significant. In some embodiments, wherein univariate module 922 of weighted outlier detection module 920 performs univariate outlier detection using a GESD test, the test statistic is significant when greater than the critical value, $R_i>\lambda_i$. In other embodiments, wherein multivariate module 924 of weighted outlier detection module 920 performs a weighted outlier detection process the test statistic is significant when the weighted Wilk's Statistic, for example represented in some embodiments by Eq. 37, is less than the critical value.

At step 1410 if the test statistic of the chosen weighted outlier detection process is not significant, process 1400 advances to step 1416 and i is advanced by 1 such that i=i+1 before returning back to step 1406 to proceed with the next sequential step of the outlier detection process. At step 1410, if the test statistic of the chosen weighted outlier detection process is significant, process 1400 advances to step 1412.

At step 1412, weighted outlier detection module 920 saves i as an outlier, and then removes the value of the peer metric $x_i$ from the set x of values in preparation for the next sequential step. As described above with reference to FIGS. 9 and 10, once an outlier value is discovered the outlier value is removed from the set of values and new statistics are calculated based on the set of values $x_{i-1}$.

At step 1416, i is advanced by 1 such that i=i+1, and process 1400 is shown returning back to step 1406 to repeat until i>r. Once i>r process 1400 is shown ending at step 1418. In some embodiments, the set of outliers determined by process 1400 includes all outliers identified in step 1412 and all peer metrics $x_i$ tested for i up to the largest i that was found significant at step 1410.

Outlier Detection User Interfaces

Referring generally to FIGS. 15-19, various illustrations of user interface displays that can be displayed to a user interface are shown. The user interface can be displayed on various devices, such as for example, a computer, a tablet, a phone, etc. Information displayed to the user interface can be gathered by one or more systems and/or pieces of equipment such as building 10 or BMS 400. In some embodiments, the information displayed to the user interface is gathered from sensors in building 10 such as temperature sensors, pressure sensors, light sensors, presence sensors, etc. For example, a building such as building 10 may integrate a peer analysis detection process performed by peer group generator 912 and peer analysis system 802 to provide outlier detection to the building based on operation data collected by building 10. In some embodiments, the information displayed to the user interface can be gathered by another system external to the a building and/or BMS configured to monitor the building and/or BMS. Still in some embodiments, operation data from multiple systems is displayed to the user interface. Therefore, information regarding the systems and/or pieces of equipment connected to peer analysis system 802 and/or other controllers, and peer analysis system 802 can be displayed to a user such that a user can be provided means for detecting outliers. In some embodiments, the user interface allows a user to interact with the outlier detection process performed by peer analysis system 802. For example, the user interface may allow a user to select a peer analysis time period, select a confidence level for the peer analysis, select a peer group for the peer analysis to be performed on, select the outlier detection method (i.e., univariate GESD, multivariate Wilk's, etc.), select the peer metrics to be analyzed by the outlier detection method, or adjust any other variable or input discussed above with regards to outlier detection process.

Figure 15:
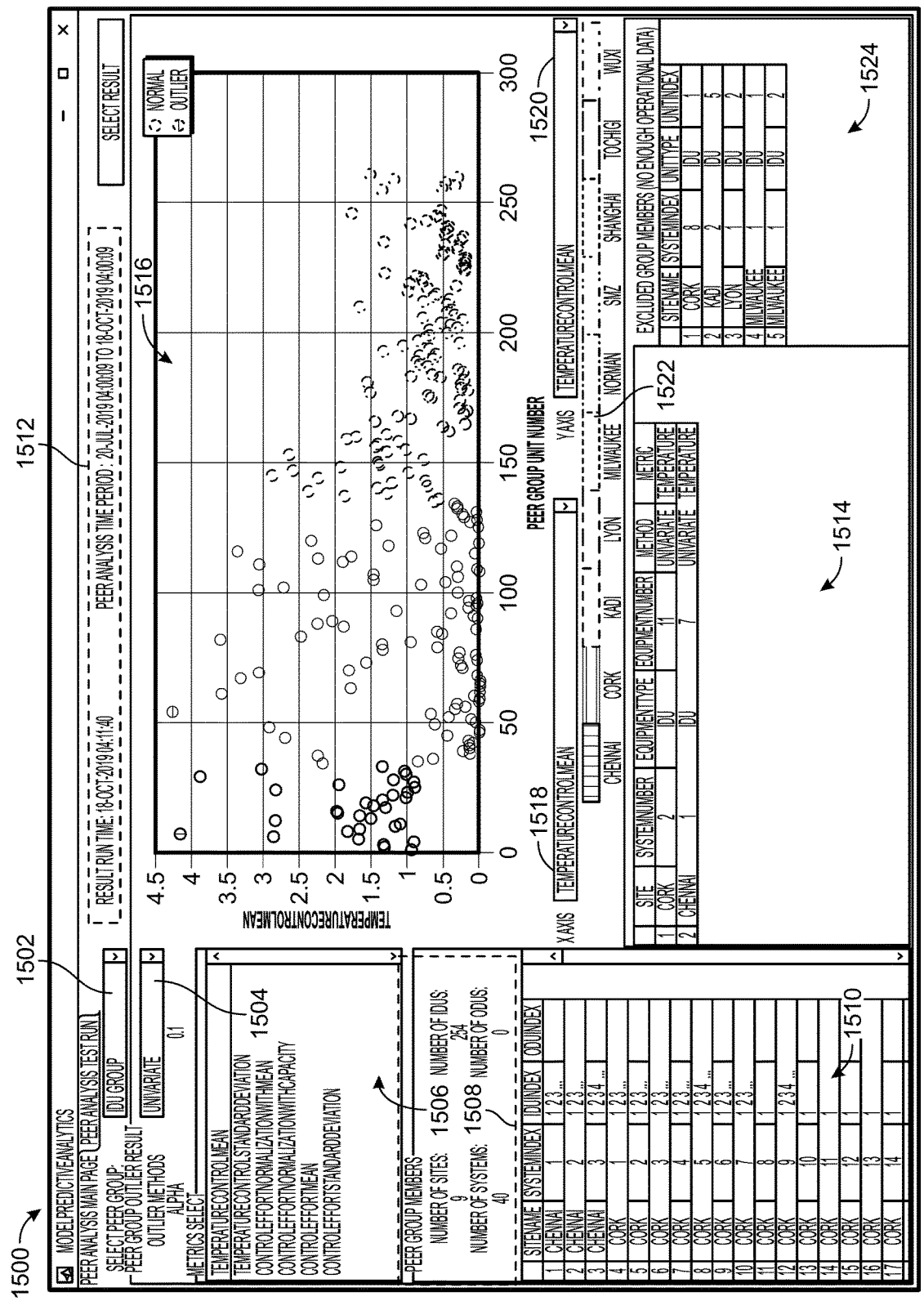
FIG. 15 is an illustration of a user interface for an univariate outlier detection process, according to some embodiments.

Referring now to FIG. 15, an illustration 1500 of a user interface for interacting with peer analysis system 802 is shown, according to some embodiments. Illustration 1500 is shown to display peer analysis main page that can be displayed to a user for initiating an outlier detection process using peer analysis system 802. Illustration 1500 is shown to include peer group selector 1502. In some embodiments, peer group selector contains the peer group(s) 914 generated by peer group generator 912 from operation data 828. In some embodiments, the peer group(s) 914 are contained in a drop-style menu, allowing a user to select which peer group to perform peer analysis including outlier detection on.

Illustration 1500 is shown to include outlier methods selector 1504. In some embodiments, outlier methods selector 1504 allows a user to select whether a univariate outlier detection process should be performed or a multivariate outlier detection process. In some embodiments, the options represented by outlier methods selector 1504 are limited by the peer group selected in peer group selector 1502. For example, if a peer group with only a single peer metric included within it is selected, only a univariate method will be available in peer group selector 1502.

Illustration 1500 is shown to include metrics selector 1506. In some embodiments, metrics selector 1506 displays the peer metric(s) 918 generated by peer metric generator 916. In some embodiments, the peer metric displayed depend on the peer group selected in peer group selector 1502. For example, peer group selector 1502 is shown to select an IDU Group in FIG. 15, and outlier methods selector is shown to select the univariate method. Accordingly, metrics selector 1506 displays peer metric for IDU systems, such as temperate control effort mean, temperature control standard deviation, control effort normalization with mean, control effort normalization with capacity, control effort mean, and control effort standardization. Metrics selector 1506 allows a user to select which peer metrics should be analyzed in a univariate method for outliers.

Illustration 1500 is shown to include peer group member information 1508. In some embodiments, the peer group member information 1508 displayed is related to the peer group selected by peer group selector 1502. The peer group member information 1508 can include the number of sites included in the peer group, the number of pieces of equipment such as IDUs, the number of systems, and the number of ODUs. Still in other embodiments the peer group member information 1508 can include information relevant to other systems such as number of chillers in the group, number of boilers in the group, number of batteries, etc.

Illustration 1500 is shown to include index 1510. In some embodiments, index 1510 displays the systems and/or pieces of equipment that compose the peer group selected in peer group selector 1502. For example as shown in FIG. 15, index 1510 includes IDU index identifiers for systems in Chennai, and Cork, and all other systems in the group.

Illustration 1500 is shown to include peer analysis runtime indicator 1512. As shown in greater detail below with reference to FIGS. 17-19, in some embodiments a user can select the peer analysis time period that the outlier detection process should be performed in. As explained above, the peer analysis time period limits what data peer analysis system 802 analyzes when generating peer metric(s) 918.

Illustration 1500 is shown to include outlier results 1514. In some embodiments, outlier results 1514 displays the values for peer metric(s) 918 for the peer metrics selected in metrics selector 1506 for the peer group selected by peer group selector 1502. As shown, in the example illustration 1500 two peer metrics were discovered for the temperature control mean of the VRF systems in the peer group named IDU Group. In some embodiments, the outlier results 1514 lists the site, system number, equipment type, equipment number, outlier detection method, and the value of the peer metric for each outlier that is listed in outlier results 1514. As shown in illustration 1500 the outlier results are also displayed in outlier results graph 1516. Outlier results graph 1516 plots the distribution of the values for the selected peer metric to the number of the system and/or piece of equipment in the peer group. For example, the systems in IDU Group are shown graphed according to their peer group number on the x-axis and their temperature control mean peer metric on the y-axis. The outlier values identified by outlier results 1514 are shown as solid points in outlier results graph 1516. Below outlier results graph 1516 in illustration 1500 there is shown the x-axis control 1518 and the y-axis control 1520. In some embodiments, the x-axis control is not available to be adjusted by a user. For example, when the univariate method is selected in outlier methods selector 1504, only one peer metric is analyzed, and the x-axis is reserved for the peer group number. Still in other embodiments, the x-axis control 1518 allows a user to select which peer metric appears on the x-axis of outlier results graph 1516, as shown in FIG. 16.

Illustration 1500 is shown to include a legend 1522. In some embodiments legend 1522 identifies which sites in the selected peer group correspond to which values displayed in outlier results graph 1516. Illustration 1500 is shown to include excluded group member list 1524. In some embodiments, some members of the selected peer group do not have enough corresponding data, for example in operation data 828, to be included in the outlier detection process. For example, the systems may be new, or may not have been operating during the selected peer analysis time period.

Figure 16:
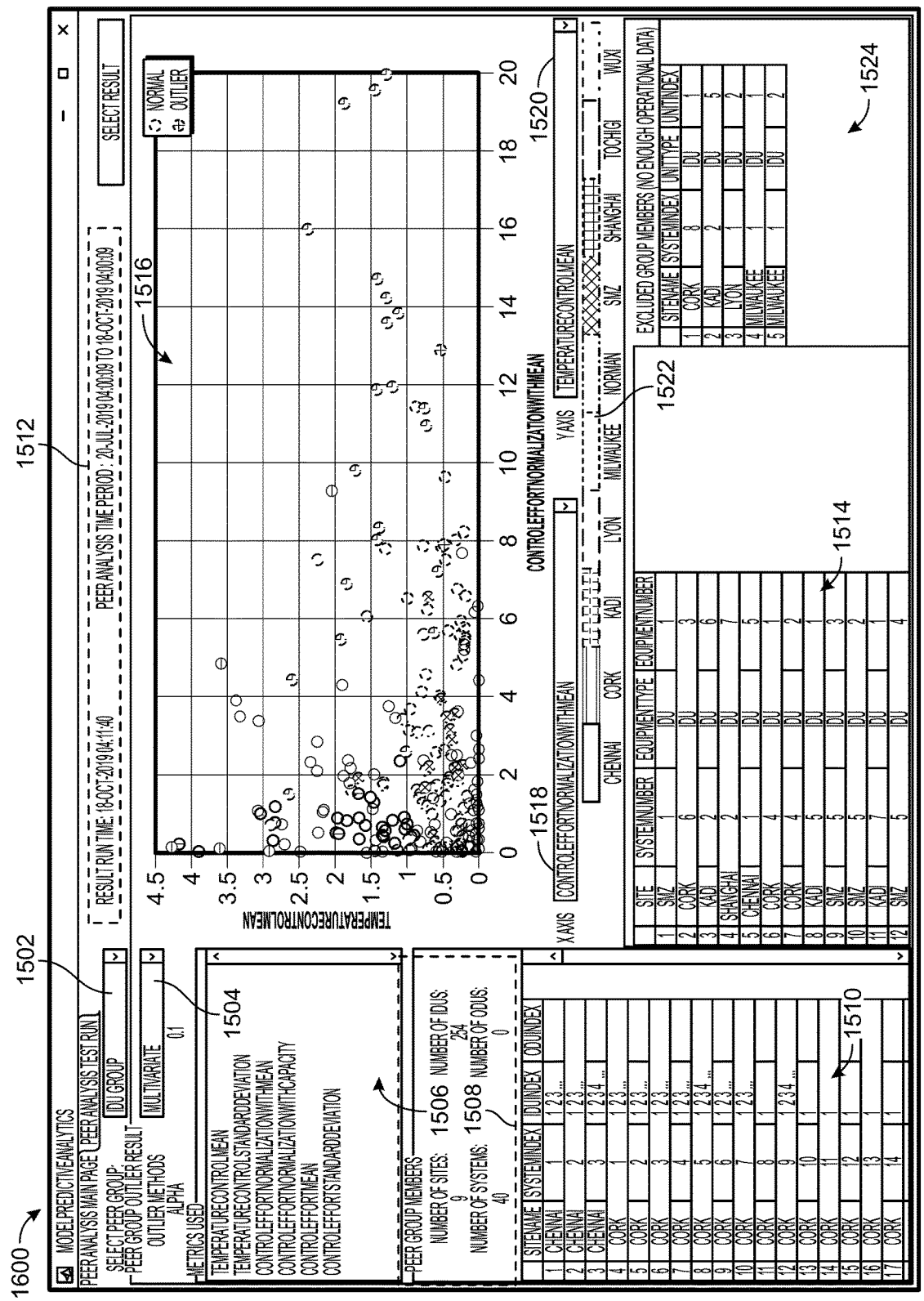
FIG. 16 is an illustration of a user interface for a multivariate outlier detection process, according to some embodiments.

Referring now to FIG. 16, an illustration 1600 of a user interface for interacting with peer analysis system 802 is shown, according to some embodiments. In illustration 1600 a multivariate outlier detection method is selected in outlier methods selector 1504 and the x-axis control 1518 and y-axis control 1520 allow a user to select which peer metrics from metrics selector 1506 are displayed on outlier results graph 1516. As shown in outlier results 1514, more outliers were detected in the multivariate process comparing the temperature control mean to the control effort normalization with mean peer metric then by the univariate process for the temperature control mean on its own as shown in FIG. 15.

Figure 17:
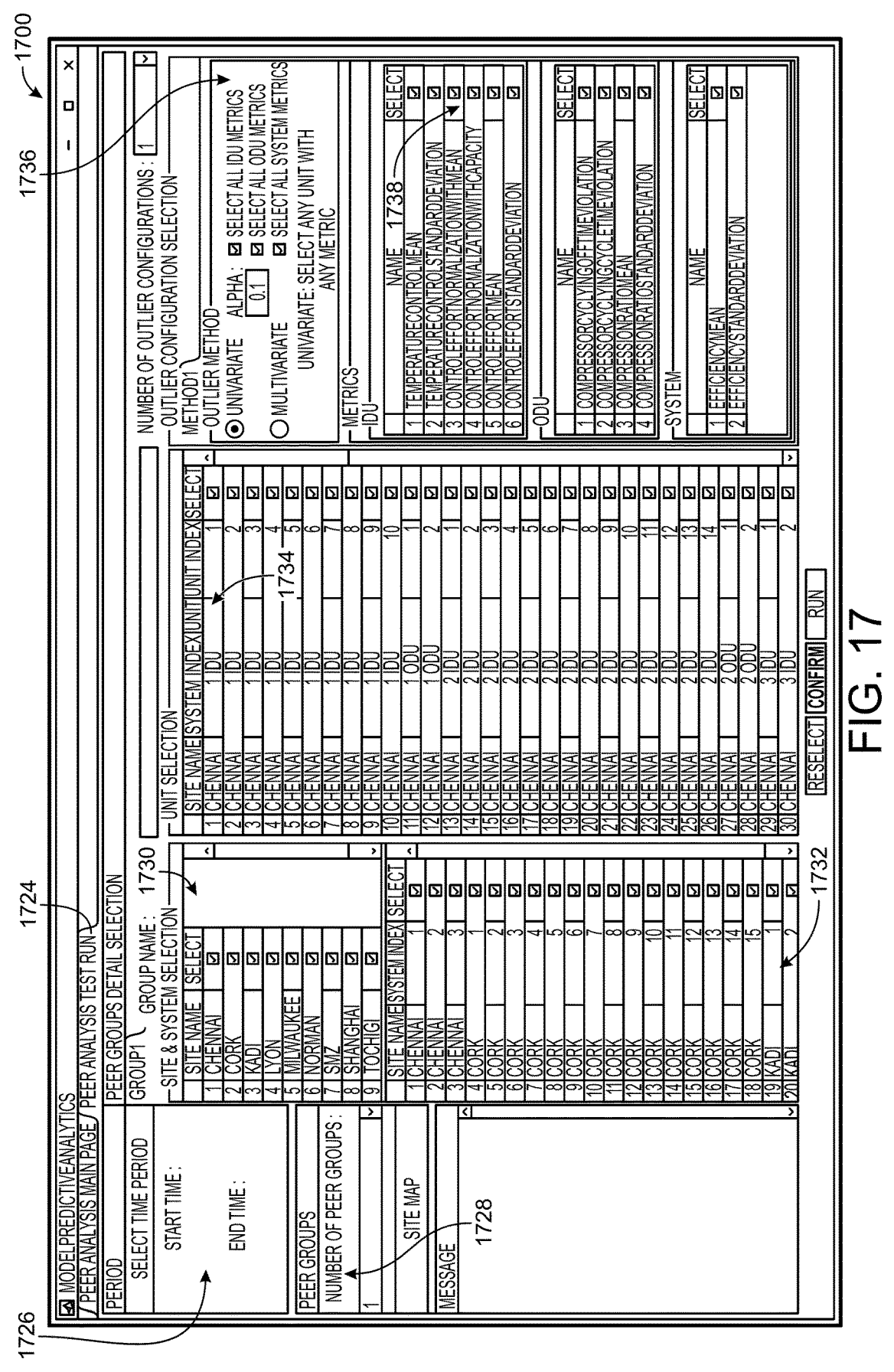

Referring now to FIG. 17, an illustration 1700 of a user interface for adjusting aspects of the peer analysis process performed by peer analysis system 802 is shown, according to some embodiments. Illustration 1700 is shown to display a peer analysis test run page 1724 of a user interface presented to a user. Illustration 1700 is also shown to include a peer analysis time period selector 1726. In some embodiments, the peer analysis time period selector 1726 allows a user to select the time period for performing the peer analysis that is displayed in FIGS. 15 and 16 in the peer analysis runtime indicator 1512.

Illustration 1700 is shown to include peer group quantity selector 1728. In some embodiments, a user can perform outlier detection on a single peer group. Still in other embodiments, a user can perform outlier selection on more than one peer group. For example, a user may perform outlier detection on a peer group of VFDs in Chennai and a peer group of VFDs in York.

Illustration 1700 is shown to include site selector 1730, system selector 1730, and unit selector 1734. In some embodiments, a user interface allows a user to select which sites and/or systems and/or units should be included in the peer analysis. For example, a user may wish to perform peer analysis on all systems with IDUs. In some embodiments, a user can deselect a site and/or system or piece of equipment, and the site and/or system will not be included in a peer group and no peer metrics or outliers will be generated based on its data.

Illustration 1700 is shown to include outlier method selection panel 1736. In some embodiments, outlier method selection panel 1736 allows a user to select between a univariate and a multi variate outlier detection method. In some embodiments, outlier method selection panel 1736 also allows a user to set a confidence level represented as alpha. In some embodiments, the outlier method selection panel 1736 also includes options for which peer metrics should be included in the peer analysis. In some embodiments, all available metrics for a system will be selected, and each will be calculated for display in outlier results 1514 and outlier results graph 1516 of FIGS. 15 and 16.

Illustration 1700 is shown to include a metrics list 1738. In some embodiments, metrics list 1738 lists the peer metrics selected by a user in the outlier method selection panel 1736 for a more detailed display. In some embodiments, metric list 1738 allows a user to select individual peer metrics for calculation. For example, all peer metrics associated with IDUs may be selected in outlier method selection panel 1736, and metrics list 1738 lists the IDU peer metrics such as temperature control mean, temperature control standard deviation, control effort normalization with mean, control effort normalization with capacity, etc. and allows a user to select specific peer metrics for inclusion/exclusion of the outlier detection process.

Figure 18:
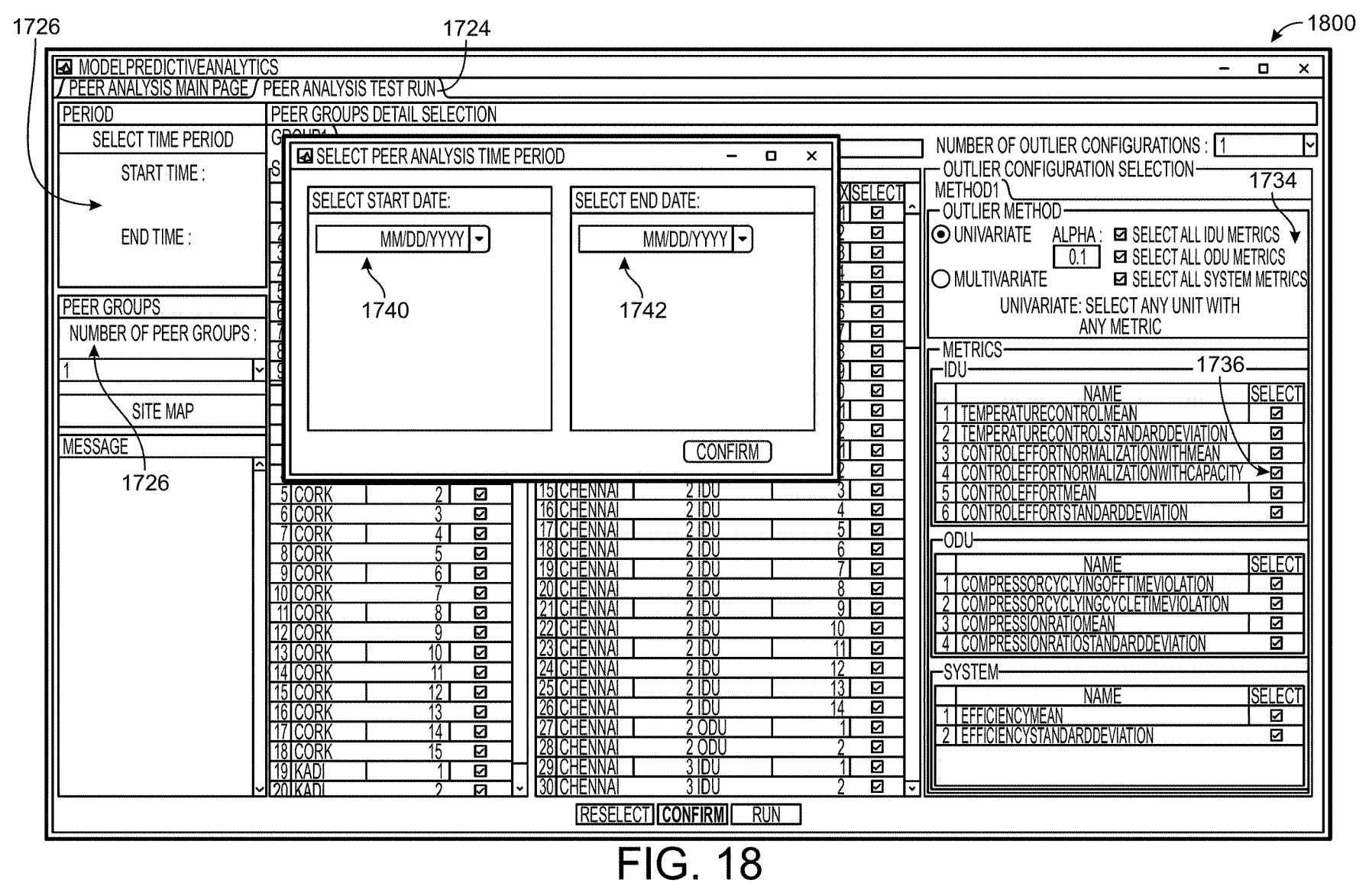

Referring now to FIG. 18, an illustration 1800 of a user interface for selecting the peer analysis time period of a peer analysis process performed by peer analysis system 802 is shown, according to some embodiments. Illustration 1800 includes peer a start date selector 1740 and an end date selector 1742 allowing a user to set the peer analysis time period for the peer analysis process performed by peer analysis system 802.

Figure 19:
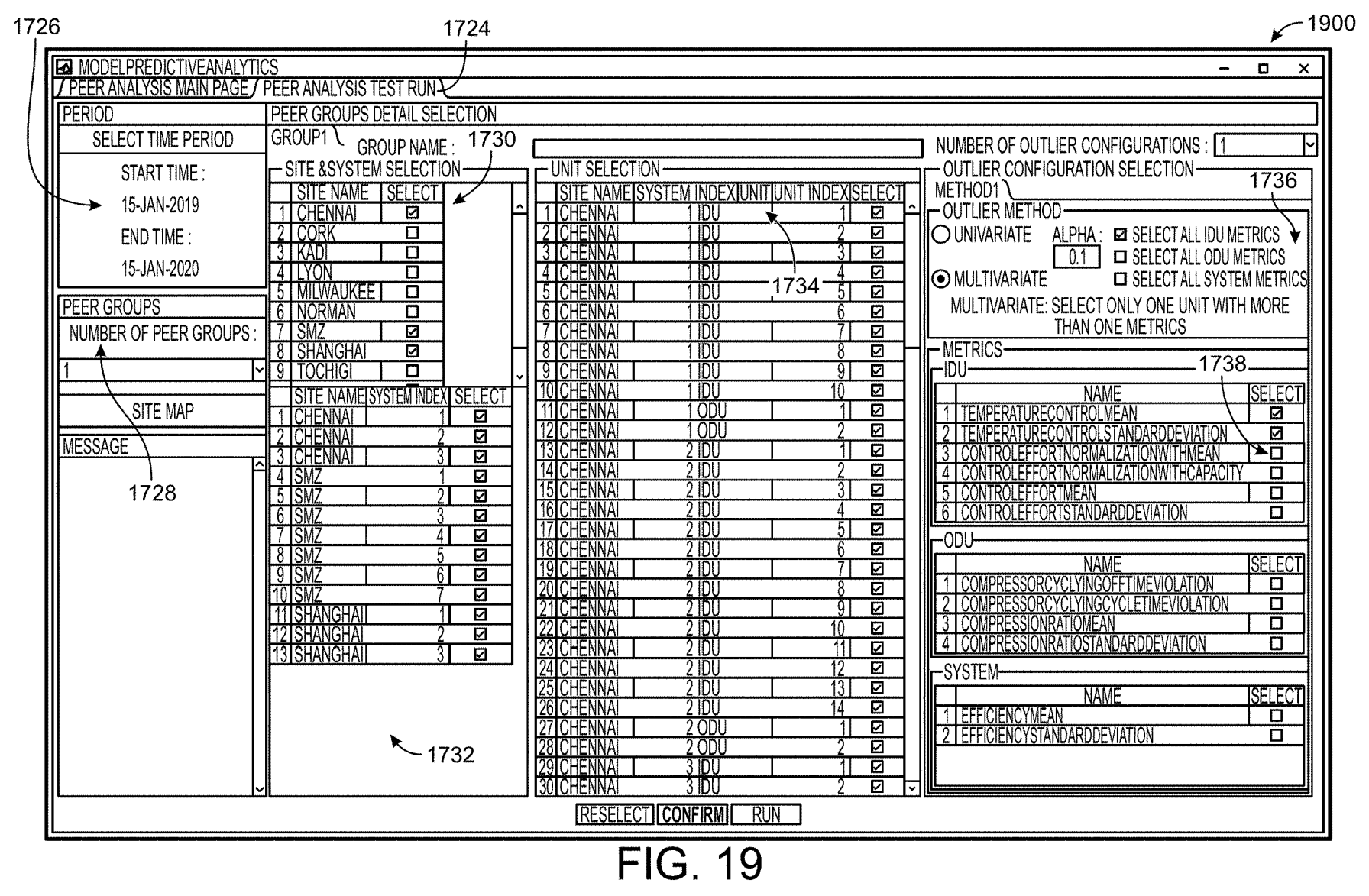

Referring now to FIG. 19, an illustration 1900 of an example peer analysis project is shown, according to some embodiments. As shown in illustration 1900 the peer analysis time period in peer analysis time period selector 1726 runs from Jan. 15, 2019 to Jan. 15, 2020. Additionally as shown in site selector 1730 only the Chennai site is selected for peer analysis. As shown in outlier method selection panel 1736 a multivariate outlier detection method is to be perform with an alpha, or confidence level of 0.1 for all IDU metrics. Metrics list 1738 only temperature control mean and the temperature control standard deviation peer metrics are selected for analysis. In some embodiments, for multivariate analysis only peer metrics from the same dimension can be compared. For example, as the temperature control mean and the temperature control standard deviation peer metrics are selected for analysis peer metrics relating to the ODU metrics and system metrics may not be available for selection.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A system for assessing relative performance among a plurality of heating, ventilation, or air condition (HVAC) assets, the system comprising a processing circuit configured to:
   identify a peer group comprising two or more of the plurality of HVAC assets having a common characteristic, the plurality of HVAC assets operable to affect one or more environmental conditions of one or more buildings; generate values of a peer metric for the HVAC assets in the peer group based on corresponding operation data associated with the HVAC assets;
   perform a weighted outlier detection process using the values of the peer metric, wherein the weighted outlier detection process comprises assigning weights to the values of the peer metric, the weights having a positive correlation with corresponding amounts of the operation data used to generate the values of the peer metric; and
   initiate an automated action in response to detecting an outlier HVAC asset, wherein the automated action comprises adjusting the operation data of at least one of the outlier HVAC asset or one or more other HVAC assets of the peer group based on a result of the weighted outlier detection process.

2. The system of claim 1, wherein the peer metric comprises at least one peer metric selected from a plurality of peer metrics based on the peer group.

3. The system of claim 1, wherein:
   the operation data comprise a measured temperature and a setpoint temperature for the plurality of HVAC assets; and
   the peer metric comprises a temperature control error based on the measured temperature and the setpoint temperature for each of the plurality of HVAC assets of the peer group.

4. The system of claim 1, wherein:
   the operation data comprise an actuation signal for a flow control device for the plurality of HVAC assets; and
   the peer metric comprises a control effort based on the actuation signal for each of the plurality of HVAC assets of the peer group.

5. The system of claim 1, wherein:
   the operation data comprise a compressor suction pressure and a compressor discharge pressure for the plurality of HVAC assets; and
   the peer metric comprises a compression ratio, based on the compressor suction pressure and the compressor discharge pressure, for each of the plurality of HVAC assets of the peer group.

6. The system of claim 1, the processing circuit further configured to:
   generate values of a plurality of peer metrics for the HVAC assets in the peer group based on corresponding operation data associated with the HVAC assets, wherein the operation data comprise a number of off times less than or equal to a first time threshold, a number of cycles, and a number of cycle times less than or equal to a second time threshold for the plurality of HVAC assets; and
   the plurality of peer metrics comprises an off time metric and a cycle time metric based on the number of off times less than or equal to a first time period, number of cycles, and number of cycle times less than or equal to a second time period for each of the plurality of HVAC assets of the peer group.

7. The system of claim 1, wherein the plurality of HVAC assets comprises a plurality of sensors configured to obtain the operation data associated with the plurality of HVAC assets.

8. The system of claim 1, wherein:
   the weighted outlier detection process is a univariate process comparing the peer metric across the plurality of HVAC assets for the peer group; and
   the univariate process comprises a weighted Generalized Extreme Studentized Deviate test.

9. The system of claim 1, wherein:
   the weighted outlier detection process is a multivariate process comparing a plurality of peer metrics for the plurality of HVAC assets in the peer group; and
   the multivariate process comprises a modified Sequential Application of Wilks's Multivariate Outlier Test.

10. The system of claim 1, the outlier detection process comprising:
    calculating a mean vector for a set comprising values of a plurality of peer metrics;
    determining a matrix of the sums of squares and cross-products ("SSCP matrix") for deviation scores of the set of values using the mean vector;
    weighting the SSCP matrix, wherein the weighting is a function of an amount of operation data used to generate the values of the plurality of peer metrics;
    determining a potential outlier HVAC asset from the plurality of HVAC assets as the HVAC asset corresponding to the peer metric value whose removal leads to the greatest reduction in the determinant of the weighted SSCP matrix;

calculating a weighted Wilk's Statistic using the peer metrics associated with the potential outlier HVAC asset and the weighted SSCP matrix; and comparing the weighted Wilk's Statistic to a critical value to determine the outlier HVAC asset.

11. A method for assessing relative performance among a plurality heating, ventilation, or air conditioning (HVAC) assets, the method comprising:

identifying a peer group comprising two or more of the plurality of HVAC assets having a common characteristic, the plurality of HVAC assets operable to affect one or more environmental conditions of one or more buildings; generating values of a peer metric for the HVAC assets in the peer group based on corresponding operation data associated with the HVAC assets;

performing a weighted outlier detection process using the values of the peer metric, wherein the weighted outlier detection process comprises assigning weights to the values of the peer metric, the weights having a positive correlation with corresponding amounts of the operation data used to generate the values of the peer metric; and initiating an automated action in response to detecting an outlier HVAC asset, wherein the automated action comprises adjusting the operation data of at least one of the outlier HVAC assets or one or more other HVAC assets of the peer group based on a result of the weighted outlier detection process.

12. The method of claim 11, wherein the automated action further comprises displaying the results of the weighted outlier detection process to a user.

13. The method of claim 11, further comprising identifying a first time period for wherein the operation data associated with the plurality of HVAC assets of the peer group belongs to the first time period.

14. The method of claim 11, wherein:

the operation data comprise a measured temperature and a setpoint temperature for the plurality of HVAC assets; and the peer metric comprises a temperature control error, based on the measured temperature and the setpoint temperature, for each of the plurality of HVAC assets of the peer group.

15. The method of claim 11, wherein:

the operation data comprise an actuation signal for a flow control device for the plurality of HVAC assets; and the peer metric comprises a control effort based on the actuation signal for each of the plurality of HVAC assets of the peer group.

16. The method of claim 11, wherein:

the operation data comprise a compressor suction pressure and a compressor discharge pressure for the plurality of HVAC assets; and the peer metric comprises a compression ratio, based on the compressor suction pressure and the compressor discharge pressure, for each of the plurality of HVAC assets of the peer group.

17. The method of claim 11, further comprising:

generating values of a plurality of peer metrics for the HVAC assets in the peer group based on corresponding operation data associated with the HVAC assets; wherein the operation data comprise a number of off times less than or equal to a first time period, a number of cycles, and a number of cycle times less than or equal to a second time period for the plurality of HVAC assets; and the plurality of peer metrics comprise an off time metric and a cycle time metric based on the number of off times less than or equal to a first time threshold, number of cycles, and number of cycle times less than or equal to a second time threshold for each of the plurality of HVAC assets of the peer group.

18. The method of claim 11, wherein:

the operation data comprise an energy consumption and heating or cooling output for the plurality of HVAC assets; and the peer metric comprises an efficiency based on the energy consumption and the heating or cooling output for each of the plurality of HVAC assets of the peer group.

19. The method of claim 11, wherein:

the weighted outlier detection process is at least one of:

a univariate process comparing the peer metric across the plurality of HVAC assets of the peer group; and a multivariate process comparing a plurality of peer metrics for the plurality of HVAC assets in the peer group of a plurality of types.

* * * * *